United States Patent
Fakoorian et al.

(10) Patent No.: US 12,238,786 B2
(45) Date of Patent: Feb. 25, 2025

(54) ENHANCED DOWNLINK CONTROL INFORMATION DETECTION

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/943,851

(22) Filed: Sep. 13, 2022

(65) Prior Publication Data
US 2023/0007685 A1    Jan. 5, 2023

Related U.S. Application Data

(62) Division of application No. 16/365,505, filed on Mar. 26, 2019, now Pat. No. 11,470,655.
(Continued)

(51) Int. Cl.
*H04L 27/26*    (2006.01)
*H04L 5/00*    (2006.01)
(Continued)

(52) U.S. Cl.
CPC .......... *H04W 74/085* (2013.01); *H04L 5/0032* (2013.01); *H04L 5/0035* (2013.01);
(Continued)

(58) Field of Classification Search
CPC .. H04W 74/085; H04W 76/27; H04L 5/0032; H04L 5/0035; H04L 5/0051; H04L 5/0053; H04L 27/2692
See application file for complete search history.

(56) References Cited

U.S. PATENT DOCUMENTS

| | | | |
|---|---|---|---|
| 2005/0147112 A1* | 7/2005 | Sugaya | H04L 1/1671 370/418 |
| 2017/0208588 A1* | 7/2017 | Park | H04L 5/001 |
| 2017/0367046 A1 | 12/2017 | Papasakellariou | |
| 2018/0249499 A1* | 8/2018 | Kim | H04W 72/0446 |
| 2018/0367358 A1 | 12/2018 | Baligh et al. | |
| 2018/0367650 A1* | 12/2018 | Motozuka | H04B 7/0695 |

(Continued)

FOREIGN PATENT DOCUMENTS

WO    WO-2018045307 A1 *    3/2018

OTHER PUBLICATIONS

3GPP TSG RAN WG1 Meeting #90 R1-1713812 Prague, P.R. Czechia, Aug. 21-25, 2017, Source: ETRI Title: Views on DMRS for NR-PDCCH Agenda Item: 6.1.3.1.1.2 RS structure/mapping (Year: 2017).*

(Continued)

*Primary Examiner* — Edan Orgad
*Assistant Examiner* — Malick A Sohrab
(74) *Attorney, Agent, or Firm* — Holland & Hart LLP

(57) ABSTRACT

Methods, systems, and devices for wireless communications are described. A user equipment (UE) may perform a transmission detection procedure on each base station before combining control information. The UE may use demodulation reference signals (DMRS) as a detection mechanism. If the UE detects a DMRS from a base station, the UE may determine that a control resource set associated with the base station is valid for combining. If the UE does not detect DMRS from the base station, the UE may refrain from combining control information from the base station. In another example, base stations that pass a listen-before-talk (LBT) procedure may transmit a preamble before transmitting control information. A preamble may carry a preamble sequence associated with a specific control resource set. The UE may identify a preamble sequence and determine that the corresponding control resource set is valid for control information combining.

17 Claims, 18 Drawing Sheets

Related U.S. Application Data

(60) Provisional application No. 62/648,599, filed on Mar. 27, 2018.

(51) Int. Cl.
*H04W 74/0833* (2024.01)
*H04W 76/27* (2018.01)

(52) U.S. Cl.
CPC .......... *H04L 5/0051* (2013.01); *H04L 5/0053* (2013.01); *H04L 27/2692* (2013.01); *H04W 76/27* (2018.02)

(56) References Cited

U.S. PATENT DOCUMENTS

| | | | |
|---|---|---|---|
| 2019/0045549 A1* | 2/2019 | Wu | H04W 72/542 |
| 2019/0158326 A1 | 5/2019 | Liao et al. | |
| 2019/0246378 A1 | 8/2019 | Islam et al. | |
| 2019/0297577 A1* | 9/2019 | Lin | H04W 52/0229 |
| 2019/0306881 A1 | 10/2019 | Fakoorian et al. | |
| 2019/0335487 A1* | 10/2019 | Son | H04W 84/12 |
| 2020/0092061 A1 | 3/2020 | Wang et al. | |
| 2020/0154467 A1 | 5/2020 | Gong et al. | |
| 2020/0220703 A1 | 7/2020 | Kim et al. | |
| 2020/0221428 A1* | 7/2020 | Moon | H04L 1/0046 |
| 2020/0344103 A1 | 10/2020 | Jung et al. | |
| 2021/0007101 A1* | 1/2021 | Tooher | H04W 72/0446 |
| 2021/0167930 A1* | 6/2021 | Jeon | H04L 27/2607 |
| 2021/0368541 A1* | 11/2021 | Hedayat | H04L 5/005 |

OTHER PUBLICATIONS

NTT Docomo Inc: "Status Report of Study on New Radio Access Technology", 3GPP TSG RAN Meeting #75, RP-170376, Dubrovnik, Croatia, Mar. 6, 2017-Mar. 9, 2017, Mar. 9, 2017 (Mar. 9, 2017), pp. 1-157, Feb. 28, 2017.

CATT: "NR Measurements and Mobility Management in Idle and Connected State," 3GPP TSG RAN WG1 Meeting #89, 3GPP Draft, R1-1707465_NR_Measurements, 3rd Generation Partnership Project (3GPP), vol. RAN WG1, No. Hangzhou, China, May 15, 2017-May 19, 2017, May 14, 2017, XP051272673, 5 pages, Retrieved from the Internet: URL: http://www.3gpp.org/ftp/Meetings_3GPP_SYNC/RAN1/Docs/ [retrieved on May 14, 2017] sections 2, 2.1, 2.2; figures 1, 2.

ETRI: "Views on DMRS for NR-PDCCH," 3GPP Draft; R1-1713812 Views on DMRS for NR-PDCCH—Final, 3rd Generation Partnership Project (3GPP), vol. RAN WG1, No. Prague, P.R., Czechia; Aug. 21, 2017-Aug. 25, 2017, Aug. 20, 2017, XP051316610, 4 Pages, Retrieved from the Internet: URL: https://www.3gpp.org/DynaReport/TDocExMtg--R1-90--17073.htm [retrieved on Aug. 20, 2017] section 2.2; figure 2.

Huawei, et al: "DMRS for DL Control Channel," 3GPP Draft; R1-1706942, 3rd Generation Partnership Project (3GPP), vol. RAN WG1, No. Hangzhou, China; May 15, 2017-May 19, 2017, May 14, 2017, XP051272172, 7 Pages, Retrieved from the Internet: URL: http://www.3gpp.org/ftp/Meetings_3GPP_SYNC/RAN1/Docs/ [retrieved on May 14, 2017] section 2.2; figures 1, 2.

International Search Report and Written Opinion—PCT/US2019/024360—ISA/EPO—Jun. 19, 2019.

International Preliminary Report on Patentability—PCT/US2019/024360, the International Bureau of WIPO—Geneva, Switzerland, Aug. 10, 2020.

International Search Report and Written Opinion—PCT/US2019/024360—ISA/EPO—Aug. 12, 2019.

Nokia, et al: "Remaining Details of PDCCH Structure", 3GPP Draft; R1-1718601_NRPDCCH Structure, 3rd Generation Partnership Project (3GPP), vol. RAN WG1, No. Prague, CZ; Oct. 9, 2017-Oct. 13, 2017, Oct. 8, 2017, XP051341775, 6 pages, Retrieved from the Internet: URL: http://www.3gpp.org/ftp/Meetings_3GPP_SYNC/RAN1/Docs/ [retrieved on Oct. 8, 2017] sections 2, 4; figures 1, 2, 3, 5.

* cited by examiner

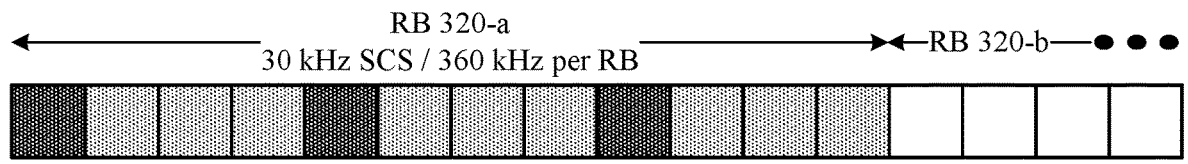
FIG. 3A
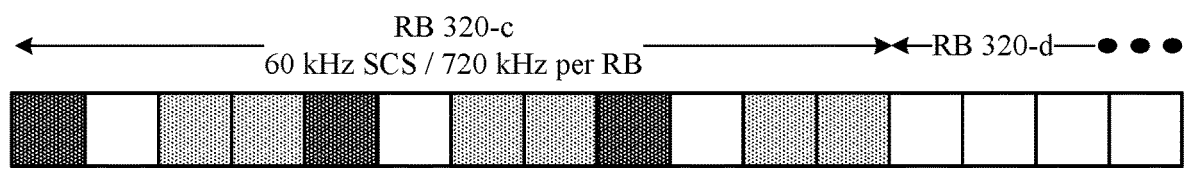
FIG. 3B
 DMRS 305
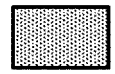 Data 310
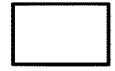 Idle 315

ENHANCED DOWNLINK CONTROL INFORMATION DETECTION

CROSS REFERENCE

The present Application for Patent is a Divisional of U.S. patent application Ser. No. 16/365,505 by FAKOORIAN et al., entitled "Enhanced Downlink Control Information Detection" filed Mar. 26, 2019, which claims benefit of U.S. Provisional Patent Application No. 62/648,599 by FAKOORIAN et al., entitled "Enhanced Downlink Control Information Detection," filed Mar. 27, 2018, assigned to the assignee hereof, and expressly incorporated by reference in its entirety.

BACKGROUND

The following relates generally to wireless communications, and more specifically to enhanced downlink control information detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

Some wireless communications systems may implement low latency wireless communications, such as ultra-reliable, low latency communications (URLLC). URLLC applications may have strict latency and reliability requirements. Downlink control information, such as physical downlink control channel (PDCCH) transmissions, may be a bottleneck for low latency communications. If a base station is unable to acquire the transmission medium in time to transmit downlink control information including a grant, or a UE misses the downlink control information, the wireless communications system may be unable to meet the strict latency and reliability requirements.

SUMMARY

Control information for a data transmission may be transmitted in multiple control resource sets, sometimes from multiple transmission and reception points (TRPs). A user equipment (UE) receiving the downlink transmission may be semi-statically configured with information about the number of downlink transmissions and the mapping of control information candidates across the control resource sets, and the UE may combine control information from the control resource sets according to this mapping. If the wireless communications system supports operations in a shared radio frequency spectrum band (such as an unlicensed or other contention-based radio frequency spectrum band), a base station or TRP may perform a listen-before-talk (LBT) procedure to obtain access to a channel of the shared radio frequency spectrum band. If the base station fails to obtain access to the channel via the LBT procedure, the preconfigured control resource sets of the base station may not carry control information. If the receiving UE still attempts to combine the control information from the multiple control resource sets associated with different TRPs, the UE may combine dummy values for the control information with legitimate values for the control information, which may degrade decoding performance.

A UE may identify which control resource sets are valid to prevent the degradation of control information described above. In a first example, the UE may perform a transmission detection procedure on each base station before combining control information. The UE may use demodulation reference signals (DMRS) as a detection mechanism. If the UE detects a DMRS from a base station, the UE may determine that the base station successfully passed LBT, and the UE may then combine control information from the base station and corresponding control resource set. If the UE does not detect DMRS from the base station, the UE may refrain from combining control information from the base station.

In another example, base stations that pass LBT may transmit a preamble before transmitting control information. A preamble may carry a preamble sequence, where each preamble sequence may be associated with a specific control resource set. If the UE detects a preamble carrying a preamble sequence specific to a control resource set, the UE may determine that the corresponding control resource set is valid for control information combining. In some cases, to improve preamble detection, a base station which passes LBT may transmit the preamble in the shared radio frequency spectrum band and outside of the shared radio frequency spectrum band. In some examples, the out-of-band preamble may be transmitted by another TRP. The preamble transmitted by the other TRP may include the preamble sequence associated with the control resource set used by the base station.

A method of wireless communications at a UE is described. The method may include performing a DMRS measurement on a shared radio frequency spectrum band for each TRP of a set of TRPs, where each TRP of the set of TRPs is associated with a control resource set of a set of control resource sets for downlink control information, receiving the downlink control information using one or more control resource sets of the set of control resource sets, the one or more control resource sets selected based on the DMRS measurement, and receiving a downlink data transmission based on the downlink control information.

An apparatus for wireless communications at a UE is described. The apparatus may include a processor, memory in electronic communication with the processor, and instructions stored in the memory. The instructions may be executable by the processor to cause the apparatus to performing a DMRS measurement on a shared radio frequency spectrum band for each TRP of a set of TRPs, where each TRP of the set of TRPs is associated with a control resource set of a set of control resource sets for downlink control information, receiving the downlink control information using one or more control resource sets of the set of control resource sets, the one or more control resource sets selected based on the DMRS measurement, and receiving a downlink data transmission based on the downlink control information.

Another apparatus for wireless communications at a UE is described. The apparatus may include performing a DMRS measurement on a shared radio frequency spectrum band for each TRP of a set of TRPs, where each TRP of the set of TRPs is associated with a control resource set of a set of control resource sets for downlink control information, receiving the downlink control information using one or more control resource sets of the set of control resource sets, the one or more control resource sets selected based on the DMRS measurement, and receiving a downlink data transmission based on the downlink control information.

A non-transitory computer-readable medium storing code for wireless communications at a UE is described. The code may include instructions executable by a processor to performing a DMRS measurement on a shared radio frequency spectrum band for each TRP of a set of TRPs, where each TRP of the set of TRPs is associated with a control resource set of a set of control resource sets for downlink control information, receiving the downlink control information using one or more control resource sets of the set of control resource sets, the one or more control resource sets selected based on the DMRS measurement, and receiving a downlink data transmission based on the downlink control information.

In some examples of the method, apparatuses, and non-transitory computer-readable medium described herein, receiving the downlink control information further may include operations, features, means, or instructions for determining the DMRS measurement may be successful for the one or more control resource sets, where selecting the one or more control resource sets may be based on the determining.

Some examples of the method, apparatuses, and non-transitory computer-readable medium described herein may further include operations, features, means, or instructions for determining frequency resources for the DMRS measurement for each TRP based at least in part at least one of: a cell ID of the TRP or a type of the UE.

Some examples of the method, apparatuses, and non-transitory computer-readable medium described herein may further include operations, features, means, or instructions for performing the DMRS measurement for each TRP on a set of resource elements (REs) configured for DMRS transmission within an RE group (REG).

In some examples of the method, apparatuses, and non-transitory computer-readable medium described herein, the set of REs configured for DMRS transmission may include operations, features, means, or instructions for a third RE of the REG, a seventh RE of the REG, and an eleventh RE of the REG.

In some examples of the method, apparatuses, and non-transitory computer-readable medium described herein, receiving the downlink control information may include operations, features, means, or instructions for determining frequency resources for the control resource set associated with each TRP of the set of TRPs based on at least one of: a cell ID of the TRP or a type of the UE.

In some examples of the method, apparatuses, and non-transitory computer-readable medium described herein, receiving the downlink control information further may include operations, features, means, or instructions for receiving the downlink control information on a set of resource elements (REs configured for downlink control information within a RE group (REG).

In some examples of the method, apparatuses, and non-transitory computer-readable medium described herein, the set of REs configured for downlink control information transmission may include operations, features, means, or instructions for a third RE of the REG, a seventh RE of the REG, and an eleventh RE of the REG.

A method of wireless communications at a UE is described. The method may include performing a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receiving the downlink control information using one or more control resource sets of the set of control resource sets; the one or more control resource sets selected based on the preamble detection procedure, and receiving a data transmission based on the downlink control information.

An apparatus for wireless communications at a UE is described. The apparatus may include a processor, memory in electronic communication with the processor, and instructions stored in the memory. The instructions may be executable by the processor to cause the apparatus to performing a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receiving the downlink control information using one or more control resource sets of the set of control resource sets; the one or more control resource sets selected based on the preamble detection procedure, and receiving a data transmission based on the downlink control information.

Another apparatus for wireless communications at a UE is described. The apparatus may include performing a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receiving the downlink control information using one or more control resource sets of the set of control resource sets; the one or more control resource sets selected based on the preamble detection procedure, and receiving a data transmission based on the downlink control information.

A non-transitory computer-readable medium storing code for wireless communications at a UE is described. The code may include instructions executable by a processor to performing a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receiving the downlink control information using one or more control resource sets of the set of control resource sets; the one or more control resource sets selected based on the preamble detection procedure, and receiving a data transmission based on the downlink control information.

In some examples of the method, apparatuses, and non-transitory computer-readable medium described herein, receiving the downlink control information may include operations, features, means, or instructions for determining that the preamble detection procedure may be successful for the one or more control resource sets and selecting the one or more control resource sets based on the determining.

In some examples of the method, apparatuses, and non-transitory computer-readable medium described herein, performing the preamble detection procedure may include operations, features, means, or instructions for detecting, for at least one control resource set of the set of control resource sets, a first preamble within a bandwidth part of the data transmission and a second preamble outside of the bandwidth part of the data transmission.

Some examples of the method, apparatuses, and non-transitory computer-readable medium described herein may further include operations, features, means, or instructions for receiving, via Radio Resource Control (RRC) signaling, a configuration to perform the preamble detection procedure outside of the bandwidth part of the data transmission.

In some examples of the method, apparatuses, and non-transitory computer-readable medium described herein, a duration of the first preamble may be based on a frequency gap between the bandwidth part and a center frequency of the second preamble.

In some examples of the method, apparatuses, and non-transitory computer-readable medium described herein, a preamble to by detected by the preamble detection procedure may include a reservation request (RRQ).

Some examples of the method, apparatuses, and non-transitory computer-readable medium described herein may further include operations, features, means, or instructions for transmitting a reservation response (RRS) in response to at least one of the preamble and the data transmission.

Some examples of the method, apparatuses, and non-transitory computer-readable medium described herein may further include operations, features, means, or instructions for transmitting the RRS occurs at least once within a bandwidth part of the data transmission and at least once outside the bandwidth part of the data transmission.

A method of wireless communications at a TRP is described. The method may include identifying a control resource set of a set of control resource sets for downlink control information, where the control resource set is specific to the TRP, performing a LBT procedure on a shared radio frequency spectrum band, transmitting, to a UE, the downlink control information on the shared radio frequency spectrum band based on the LBT procedure and using the control resource set specific to the TRP, and transmitting data to the UE based on the downlink control information.

An apparatus for wireless communications at a TRP is described. The apparatus may include a processor, memory in electronic communication with the processor, and instructions stored in the memory. The instructions may be executable by the processor to cause the apparatus to identifying a control resource set of a set of control resource sets for downlink control information, where the control resource set is specific to the TRP, performing a LBT procedure on a shared radio frequency spectrum band, transmitting, to a UE, the downlink control information on the shared radio frequency spectrum band based on the LBT procedure and using the control resource set specific to the TRP, and transmitting data to the UE based on the downlink control information.

Another apparatus for wireless communications at a TRP is described. The apparatus may include identifying a control resource set of a set of control resource sets for downlink control information, where the control resource set is specific to the TRP, performing a LBT procedure on a shared radio frequency spectrum band, transmitting, to a UE, the downlink control information on the shared radio frequency spectrum band based on the LBT procedure and using the control resource set specific to the TRP, and transmitting data to the UE based on the downlink control information.

A non-transitory computer-readable medium storing code for wireless communications at a TRP is described. The code may include instructions executable by a processor to identifying a control resource set of a set of control resource sets for downlink control information, where the control resource set is specific to the TRP, performing a LBT procedure on a shared radio frequency spectrum band, transmitting, to a UE, the downlink control information on the shared radio frequency spectrum band based on the LBT procedure and using the control resource set specific to the TRP, and transmitting data to the UE based on the downlink control information.

In some examples of the method, apparatuses, and non-transitory computer-readable medium described herein, transmitting the downlink control information further may include operations, features, means, or instructions for transmitting a DMRS.

Some examples of the method, apparatuses, and non-transitory computer-readable medium described herein may further include operations, features, means, or instructions for selecting frequency resources for transmitting the DMRS based at least in part at least one of: a cell ID of the TRP or a type of the UE.

In some examples of the method, apparatuses, and non-transitory computer-readable medium described herein, the DMRS may be transmitted on a set of REs configured for DMRS transmission within an REG.

In some examples of the method, apparatuses, and non-transitory computer-readable medium described herein, the set of REs configured for DMRS transmission may include operations, features, means, or instructions for a third RE of the REG, a seventh RE of the REG, and an eleventh RE of the REG.

In some examples of the method, apparatuses, and non-transitory computer-readable medium described herein, transmitting the downlink control information further may include operations, features, means, or instructions for boosting a transmission power of the downlink control information with a boosted transmission power.

Some examples of the method, apparatuses, and non-transitory computer-readable medium described herein may further include operations, features, means, or instructions for selecting REs for the downlink control information transmission based on the boosted transmission power.

In some examples of the method, apparatuses, and non-transitory computer-readable medium described herein, transmitting the downlink control information may include operations, features, means, or instructions for determining frequency resources for the control resource set associated with the TRP based on at least one of: a cell ID of the TRP or a type of the UE.

In some examples of the method, apparatuses, and non-transitory computer-readable medium described herein, transmitting the downlink control information further may include operations, features, means, or instructions for transmitting the downlink control information on a set of REs configured for downlink control information within a REG.

In some examples of the method, apparatuses, and non-transitory computer-readable medium described herein, the set of REs configured for downlink control information transmission may include operations, features, means, or instructions for a third RE of the REG, a seventh RE of the REG, and an eleventh RE of the REG.

A method of wireless communications at a TRP is described. The method may include identifying a control resource set of a set of control resource sets for downlink control information, transmitting, to a UE, a preamble for the downlink control information on a shared radio frequency spectrum band, where the preamble includes a unique preamble sequence specific to the control resource set, transmitting the downlink control information on the shared radio frequency spectrum band using the control resource set based on the preamble, and transmitting data based on the downlink control information.

An apparatus for wireless communications at a TRP is described. The apparatus may include a processor, memory in electronic communication with the processor, and instructions stored in the memory. The instructions may be executable by the processor to cause the apparatus to identifying a control resource set of a set of control resource sets for downlink control information, transmitting, to a UE, a preamble for the downlink control information on a shared radio frequency spectrum band, where the preamble includes a unique preamble sequence specific to the control resource set, transmitting the downlink control information on the shared radio frequency spectrum band using the control resource set based on the preamble, and transmitting data based on the downlink control information.

Another apparatus for wireless communications at a TRP is described. The apparatus may include identifying a control resource set of a set of control resource sets for downlink control information, transmitting, to a UE, a preamble for the downlink control information on a shared radio frequency spectrum band, where the preamble includes a unique preamble sequence specific to the control resource set, transmitting the downlink control information on the shared radio frequency spectrum band using the control resource set based on the preamble, and transmitting data based on the downlink control information.

A non-transitory computer-readable medium storing code for wireless communications at a TRP is described. The code may include instructions executable by a processor to identifying a control resource set of a set of control resource sets for downlink control information, transmitting, to a UE, a preamble for the downlink control information on a shared radio frequency spectrum band, where the preamble includes a unique preamble sequence specific to the control resource set, transmitting the downlink control information on the shared radio frequency spectrum band using the control resource set based on the preamble, and transmitting data based on the downlink control information.

In some examples of the method, apparatuses, and non-transitory computer-readable medium described herein, transmitting the preamble may include operations, features, means, or instructions for transmitting a first preamble within a bandwidth part of the data transmission and a second preamble outside of the bandwidth part of the data transmission.

Some examples of the method, apparatuses, and non-transitory computer-readable medium described herein may further include operations, features, means, or instructions for transmitting, via RRC signaling, a configuration to perform a preamble detection procedure outside of the bandwidth part.

In some examples of the method, apparatuses, and non-transitory computer-readable medium described herein, a duration of the first preamble may be based on a frequency gap between the bandwidth part and a center frequency of the second preamble.

Some examples of the method, apparatuses, and non-transitory computer-readable medium described herein may further include operations, features, means, or instructions for transmitting, via a backhaul connection to a second TRP, an indication of a successful LBT procedure.

Some examples of the method, apparatuses, and non-transitory computer-readable medium described herein may further include operations, features, means, or instructions for transmitting a first preamble within a bandwidth part of the data transmission, where the indication includes a request for the second TRP to transmit a second preamble outside of the bandwidth part of the data transmission.

In some examples of the method, apparatuses, and non-transitory computer-readable medium described herein, the preamble includes a RRQ. Some examples of the method, apparatuses, and non-transitory computer-readable medium described herein may further include operations, features, means, or instructions for receiving a RRS in response to at least one of the preamble and the data transmission.

Some examples of the method, apparatuses, and non-transitory computer-readable medium described herein may further include operations, features, means, or instructions for receiving the RRS occurs at least once within a bandwidth part of the data transmission and at least once outside the bandwidth part of the data transmission.

BRIEF DESCRIPTION OF THE DRAWINGS

FIGS. 3A and 3B illustrate examples of demodulation reference signal (DMRS) power boosting configurations that support enhanced downlink control information detection in accordance with aspects of the present disclosure.

DETAILED DESCRIPTION

Figure 1:
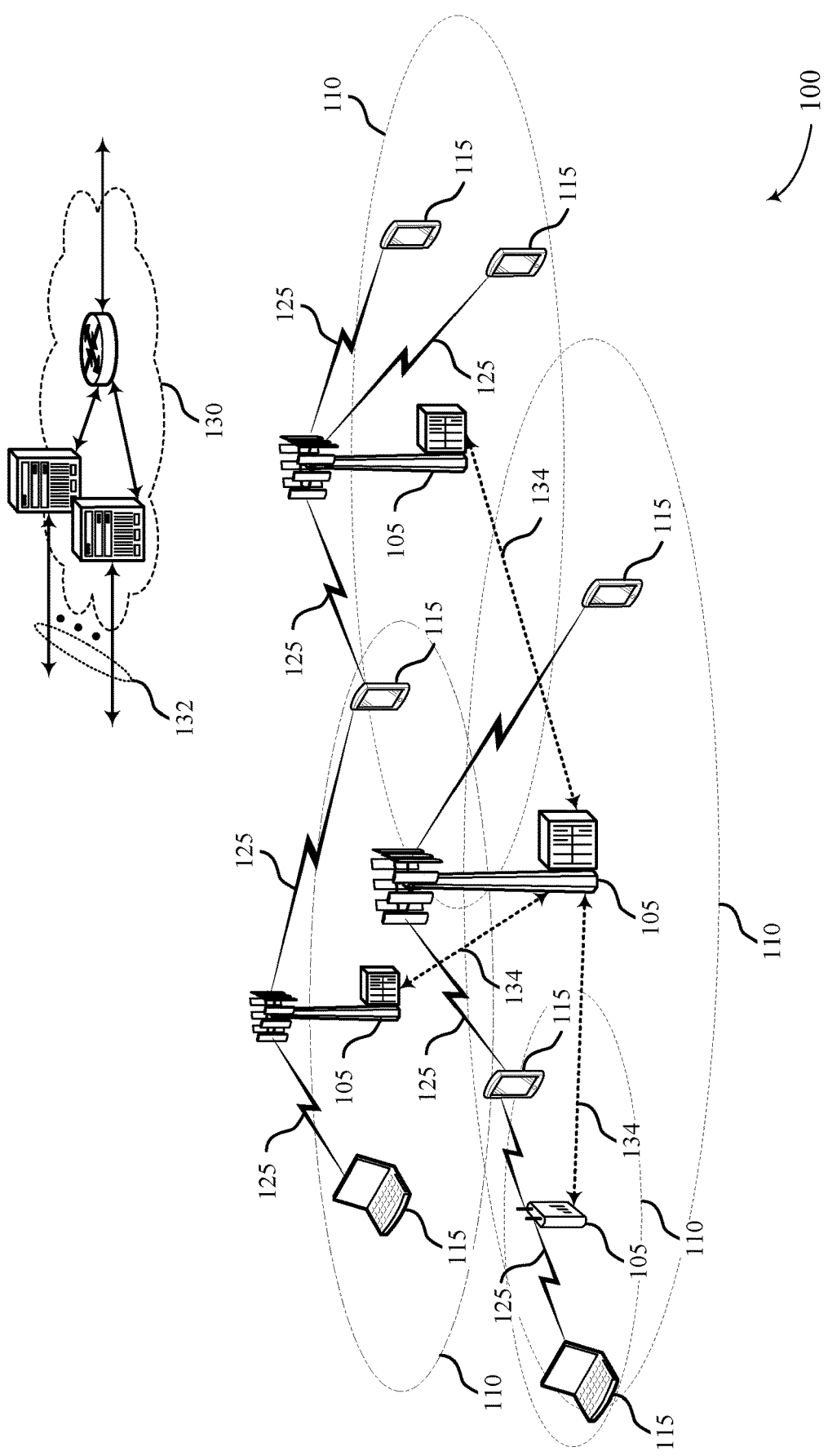
FIG. 1 illustrates an example of a wireless communications system that supports enhanced downlink control information detection in accordance with aspects of the present disclosure.

Some wireless communications systems implement low latency wireless communications, such as ultra-reliable, low latency communications (URLLC). URLLC applications may have strict latency and reliability requirements. Downlink control information, such as physical downlink control channel (PDCCH) transmissions, may be a bottleneck for low latency communications. If a base station or transmission reception point (TRP) is unable to acquire the transmission medium in time to transmit downlink control information including a grant, or a user equipment (UE) misses the downlink control information, the wireless communications system may be unable to meet the strict latency and reliability requirements. In some cases, to increase reliability of downlink control information to meet the strict latency and reliability requirements of low latency communications, control information for a data transmission to a UE may be transmitted in multiple control resource sets, sometimes from multiple base stations. The receiving UE may be semi-statically configured with information about the number of downlink transmissions and how different candidates are mapped across different control resource sets. The UE may combine PDCCH information from multiple control resource sets associated with different base stations or TRPs to improve performance when decoding the PDCCH information.

If the wireless communications system supports operations over a shared radio frequency spectrum band, such as an unlicensed or other contention-based access band, a base station or TRP may perform a listen-before-talk (LBT) procedure to obtain access to a channel of the shared radio frequency spectrum band. If the base station or TRP fails to gain access to the channel through the LBT procedure, the preconfigured control resource sets of the base station or TRP may not carry PDCCH information. If the receiving UE still attempts to combine the PDCCH information from the control resource set associated with a TRP that failed to gain access to the channel, the UE may combine dummy values with legitimate values for the PDCCH information, which may degrade decoding performance. Herein are described techniques for a UE to identify which control resource sets are valid to prevent adding dummy values when combining PDCCH.

In a first example, a UE may perform a transmission detection procedure on each base station before combining PDCCH. The UE may use demodulation reference signals (DMRS) as a detection mechanism. If the UE detects a DMRS from a base station or TRP, the UE may determine that the base station or TRP successfully passed LBT. The UE may then combine PDCCH from the base station. If the UE does not detect DMRS from the base station or TRP, the UE may refrain from combining PDCCH from the base station or TRP.

A base station or TRP may select resource elements (REs) in a control resource set for DMRS transmission based on a cell ID associated with the base station or a type of the receiving UE (e.g., if the UE is a low latency device or mobile broadband (MBB)). In some cases, a base station or TRP may transmit DMRS with a boosted transmission power to improve detection of the DMRS.

In another example, base stations or TRPs that pass LBT may transmit a preamble before PDCCH transmission. The preambles may have a different numerology, such as a larger subcarrier spacing (SCS), than PDCCH. A preamble may carry a preamble sequence, where each preamble sequence may be associated with a specific control resource set. If the UE detects a preamble carrying a preamble sequence specific to a control resource set, the UE may determine that the corresponding control resource set is valid for PDCCH combining. In some cases, the preamble may be similar to a reservation request (RRQ) or a request-to-send (RTS).

In some cases, to improve preamble detection, a first base station or TRP which passes LBT may transmit the preamble in the shared radio frequency spectrum band and outside of the shared radio frequency spectrum band. Transmitting the preamble in-band and out-of-band may increase the probability that the UE detects the preamble and identifies the preamble sequence. The out-of-band preamble may be transmitted on the same carrier as the in-band, for example in another bandwidth part. In some examples, the out-of-band preamble may be transmitted by a second base station or TRP, such as a millimeter-wave (mmW) base station or TRP backhauled with the base station or TRP which passes LBT. The second base station or TRP may indicate that the first base station or TRP passed LBT based on the preamble sequence transmitted in the preamble. The preamble transmitted by the second base station or TRP may include the preamble sequence associated with the control resource set used by the first base station or TRP.

Aspects of the disclosure are initially described in the context of a wireless communications system. Aspects of the disclosure are further illustrated by and described with reference to apparatus diagrams, system diagrams, and flowcharts that relate to enhanced downlink control information detection.

FIG. 1 illustrates an example of a wireless communications system 100 that supports enhanced downlink control information detection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a TRP, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105). It should be understood that the terms "base station" and "TRP" are used interchangeably. Thus, functions attributed to a base station or a TRP in the present disclosure may be implemented by a standalone base station comprising a single TRP, a base station controlling one or more TRPs, one or more TRPs controlled by a base station, or a combination thereof.

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Control information for a data transmission may be transmitted in multiple control resource sets, sometimes from multiple TRPs, or base stations 105, to improve reliability. The UE 115 receiving the data transmission may semi-statically know the number of downlink transmissions and the mapping of candidates across the control resource sets, and the UE may combine PDCCH information from the control resource sets. A base station 105 may perform an LBT procedure to be granted access to the transmission medium. If the base station 105 fails the LBT procedure, the preconfigured control resource sets of the base station 105 may not carry PDCCH information. If the UE 115 still attempts to combine the PDCCH information from the control resource set, the UE 115 may combine dummy values, which may degrade decoding performance.

A UE 115 may identify which control resource sets are valid to prevent adding dummy values when combining PDCCH. In a first example, the UE 115 may perform a transmission detection procedure on each base station before combining PDCCH. The UE 115 may use DMRS as a detection mechanism. If the UE 115 detects a DMRS from a base station, the UE 115 may determine that the base station successfully passed LBT, and the UE 115 may then combine PDCCH from the base station and corresponding control resource set. If the UE 115 does not detect DMRS from the base station, the UE 115 may refrain from combining PDCCH from the base station 105.

In another example, TRPs or base stations 105 that pass LBT may transmit a preamble before PDCCH transmission. A preamble may carry a preamble sequence, where each preamble sequence may be associated with a specific control resource set. If the UE 115 detects a preamble carrying a preamble sequence specific to a control resource set, the UE 115 may determine that the corresponding control resource set is valid for PDCCH combining. In some cases, to improve preamble detection, a base station which passes LBT may transmit the preamble in the shared radio frequency spectrum band and outside of the shared radio frequency spectrum band. In some examples, the out-of-band preamble may be transmitted by another TRP. The preamble transmitted by the other TRP may include the preamble sequence associated with the control resource set used by the base station 105.

Figure 2:
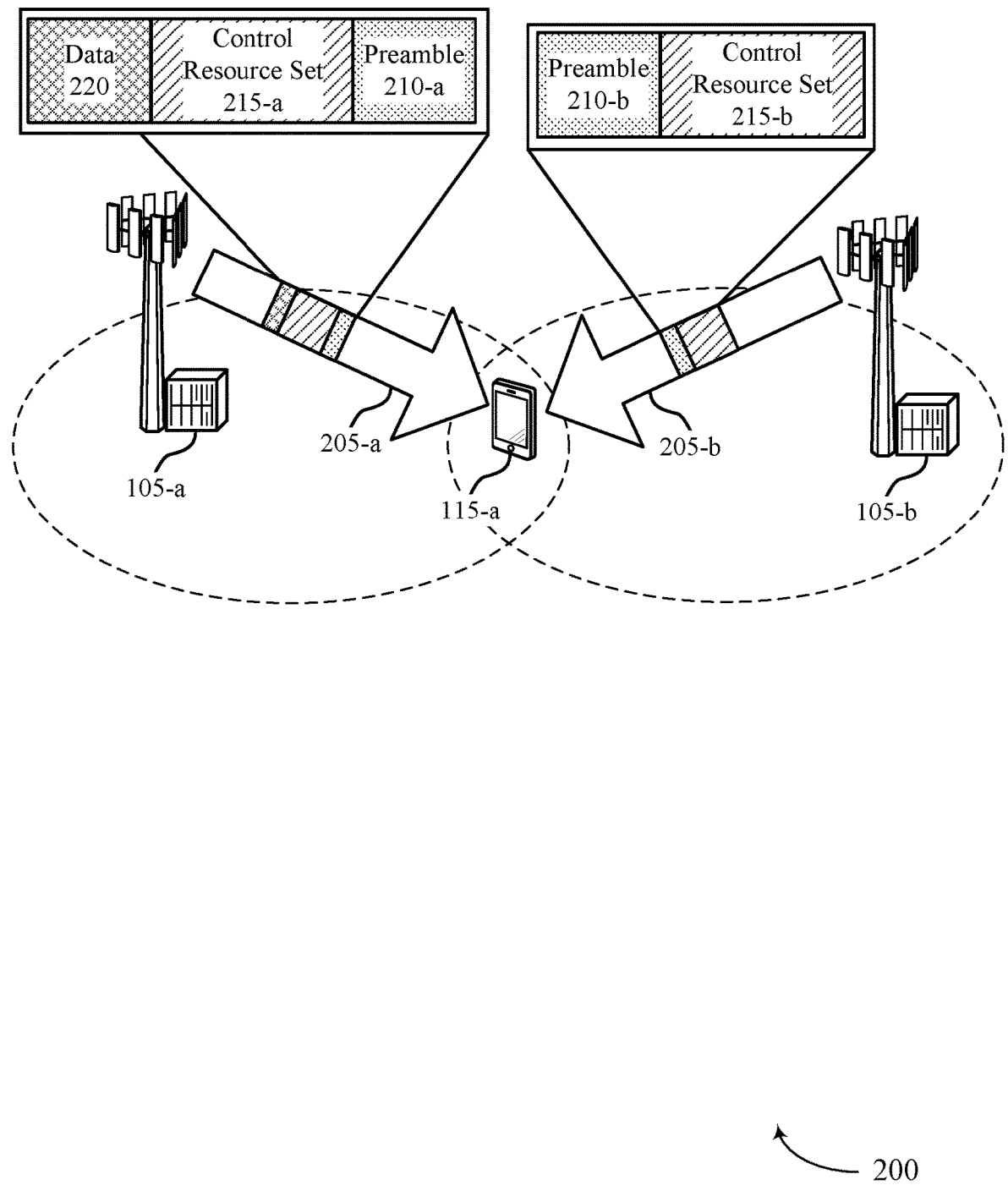
FIG. 2 illustrates an example of a wireless communications system that supports enhanced downlink control information detection in accordance with aspects of the present disclosure.

FIG. 2 illustrates an example of a wireless communications system 200 that supports enhanced downlink control information detection in accordance with aspects of the present disclosure. In some examples, wireless communications system 200 may implement aspects of wireless communications system 100. Wireless communications system 200 may include base station 105-a and base station 105-b, which may be examples of a base station 105 as described herein. Base stations 105 may be referred to as TRPs. Wireless communications system 200 may also include UE 115-a, which may be an example of a UE 115 as described herein. Base station 105-a and base station 105-b may transmit to UE 115-a via downlink transmissions 205-a and 205-b respectively.

The wireless communications system 200 may implement low latency wireless communications, such as URLLC. URLLC applications may have strict latency and reliability requirements. Downlink control information, such as PDCCH transmissions, may be a bottleneck for low latency communications. If a base station 105 is unable to acquire the transmission medium in time to transmit downlink control information including a grant, or a UE 115 misses the downlink control information, the wireless communications system 200 may be unable to meet the strict latency and reliability requirements. The wireless communications system 200 may implement techniques to increase reliability of downlink control information to meet the strict latency and reliability requirements of low latency communications.

In some examples, control information for a data transmission 220 (e.g., a physical downlink shared channel (PDSCH) transmission) may be transmitted in multiple control resource sets 215, sometimes from multiple base stations 105. For example, base station 105-a may transmit downlink control information (DCI) to UE 115-a in control resource set 215-a, and base station 105-b may transmit DCI to UE 115-a in control resource set 215-b, and both DCI may be for the data transmission 220. UE 115-a may semi-statically know the number of downlink transmissions 205 and how different candidates are mapped across different control resource sets 215. UE 115-a may be preconfigured with the search spaces for the control resource sets 215. For example, for each aggregation level, the first candidate in control resource set 215-a may be associated with the first candidate in control resource set 215-b. UE 115-a may combine PDCCH information from multiple control resource sets 215 to improve performance when decoding the PDCCH information. UE 115-a may receive the semi-static configuration via RRC signaling or other higher layer signaling. In some examples, a TRP may be associated with multiple control resource sets.

Wireless communications system 200 may support shared wireless communications using shared radio frequency spectrum bands. In shared wireless communications, a base station 105 may fail an LBT procedure and may not be granted access to the transmission medium. If a base station 105 fails an LBT procedure, the preconfigured control resource sets of the base station 105 may not carry PDCCH information. If the receiving UE 115 still attempts to combine the PDCCH information from the control resource set of the base station 105 that failed LBT, the UE 115 may combine dummy log likelihood ratios (LLRs), or invalid information. For example, those resources may have been used by another device, and combining invalid resource sets may in some cases degrade decoding performance. In some cases, backhaul communications between TRPs may not be ideal, and a TRP which is blocked from transmitting due to a failed LBT may not be easily replaced by another TRP. Wireless communications system 200 may further implement techniques for UE 115-a to identify which control resource sets are valid to prevent adding dummy LLRs when combining PDCCH.

In a first example, UE 115-a may perform a transmission detection procedure on each base station 105 before combining PDCCH. UE 115-a may use PDCCH DMRS as a detection mechanism. If UE 115-a detects a DMRS from a base station 105, UE 115-a may determine that the base station 105 successfully gained access to the transmission medium. UE 115-a may then combine PDCCH from the base station 105. If UE 115-a does not detect DMRS from the base station 105, UE 115-a may refrain from combining PDCCH from the base station 105.

A base station 105 may select REs in a control resource set 215 for DMRS transmission based on a cell ID associated with the base station 105 or a type of the receiving UE. For example, DMRS for low latency devices may be mapped to REs 3, 7, and 11 within each RE group (REG), while non-low latency or mobile broadband (MBB) UEs 115 may have DMRS mapped to REs 1, 5, and 9 in each REG. In some cases, the location of the DMRS tones, PDCCH tones, and null tones may be shifted based on cell ID. Base station 105-a and base station 105-b may have different cell IDs, and therefore may utilize different REs or RE patterns to assign DMRS. For example, RE selection may be based on the equation $v_{shift}=N_{IC}^{cell} \mod 4$. In some cases, some control resource sets 215 of the wireless communications system 200 may have frequency shifted DMRS RE locations, while other control resource sets 215 may not. In some cases, a base station 105 may implement transmission power boosting techniques as described with reference to FIGS. 3A and 3B. In some examples, configurable RE selection for DMRS may improve PDCCH detection for low latency UEs when DMRS transmission is power boosted.

In another example, base stations 105 that pass LBT may transmit a preamble 210 before PDCCH transmission. A preamble 210 may have a different numerology, such as a larger SCS, than PDCCH. A preamble 210 may carry a preamble sequence, where each preamble sequence may be associated with a specific control resource set 215. For example, base station 105-a may transmit preamble 210-a, carrying a preamble sequence specific to control resource set 215-a. Base station 105-b may transmit preamble 210-b, carrying a preamble sequence specific to control resource set 215-b. If UE 115-a detects preamble 210-a carrying the preamble sequence specific to control resource set 215-a, UE 115-a may determine that base station 105-a passed LBT, and UE 115-*a* may combine PDCCH from base station 105-*a*. In some cases, the preamble may be similar to an RRQ.

In some cases, to improve preamble detection, a base station 105 which passes LBT may transmit the preamble 210 in the radio frequency spectrum band and outside of the radio frequency spectrum band. Transmitting the preamble in-band and out of band may increase the probability that UE 115-*a* detects the preamble 210 and identifies the preamble sequence. The out of band preamble may be transmitted on the same carrier as the in-band, for example in another bandwidth part. In some cases, the duration of the preamble may be based on the frequency gap between the in-band preamble and the out-of-band preamble, or based on the returning time between the in-band preamble and the out-of-band preamble.

In some examples, the out-of-band preamble may be transmitted by another TRP, such as an mmW TRP, backhauled with the base station 105 which passes LBT. The mmW TRP may implicitly indicate the corresponding base station 105 passed LBT based on the preamble sequence transmitted in the preamble. For example, base station 105-*a* is associated with control resource set 215-*a* and transmits preamble 210-*a*, preamble 210-*a* including a preamble sequence associated with control resource set 215-*a*. Base station 105-*a* may indicate its LBT success to an mmW TRP via a backhaul link, and the mmW TRP may transmit an out-of-band preamble including the preamble sequence associated with control resource set 215-*a*. If UE 115-*a* identifies the preamble sequence associated with control resource set 215-*a*, UE 115-*a* may determine to combine the PDCCH information transmitted in control resource set 215-*a*. The mmW TRP may transmit the out-of-band preamble as described with reference to FIG. 4.

FIGS. 3A and 3B illustrate examples of DMRS power boosting configurations 300 and 301 that enhanced downlink control information detection in accordance with aspects of the present disclosure. In some examples, DMRS power boosting 300 may implement aspects of wireless communications system 100.

Control resource sets carrying PDCCH information may be preconfigured, and a UE 115 may anticipate PDCCH information in the preconfigured control resource sets. If a base station 105 passed LBT, the receiving UE 115 may combine PDCCH information from the corresponding control resource set. If the base station 105 did not pass LBT, the control resource set may instead carry dummy information, which may not help in decoding the PDCCH information. To determine whether to combine PDCCH in a control resource set, a receiving UE 115 may perform a transmission detection procedure on the control resource set as described with reference to FIG. 2. The transmission detection may be based on DMRS. If the UE 115 detects a DMRS from the base station 105 in a control resource set, the UE 115 may determine the base station 105 passed LBT, and the UE 115 may combine PDCCH in the control resource set.

In some examples, the base station 105 may boost the transmission power of the DMRS to assist the receiving UE 115 in detecting the DMRS. However, some examples of a wireless communications system 100 may have power spectral density (PSD) constraints, which may restrict power boosting configurations. DMRS power boosting configurations 300 and 301 show example configurations for power boosting under some PSD constraints. The base station 105 may indicate the power boosting configuration to the UE 115 via RRC, or another higher layer signaling. In DMRS power boosting configuration 300 and 301, DMRS is assigned to REs 1, 5, and 9. In other implementations not shown, DMRS may be assigned to REs 3, 7, and 11, or according to other mapping configurations.

In some examples, described techniques may have improved transmission diversity than transmitting downlink control information in the same time and frequency resources and combining PDCCH over-the-air.

In FIG. 3A, DMRS power boosting configuration 300 includes resource block (RB) 320-*a* and RB 320-*b*. RB 320-*a* and RB 320-*b* may have 30 kHz SCS, with 360 kHz per RB (e.g., 12 REs in an RB 320). RB 320-*a* may include three REs allocated for DMRS 305, each separated by three REs allocated for data 310. In some cases, alternate RBs 320 may be left idle. For example, RB 320-*b*, may be adjacent to RB 320-*a* and idle, including idle REs 315. In some cases, DMRS power boosting configuration 300 may support power boosting the DMRS 305 and the data 310. As shown there may be less than three RBs 320 within 1 MHz.

In FIG. 3B, DMRS power boosting configuration 301 includes RB 320-*c* and RB 320-*d*. There may be idle REs 315 within RB 320-*c*. DMRS power boosting configuration 301 supports 60 kHz SCS, with 720 kHz per RB 320. In some cases, the DMRS tone locations in DMRS power boosting configuration 301 may be changed for different cells such that the power boosting does not introduce cross-cell interference. For example, RE locations for DMRS transmission may be selected based on a number of different factors, such as cell ID and a type of receiving UE 115 (e.g., low latency or MBB). In DMRS power boosting configuration 301, the DMRS 305 may be power boosted. In some cases, alternate RBs 320 may be idle, or adjacent RBs 320 may use the same structure. For example, RB 320-*d* may have similar structure of DMRS 305, data 310, and idle REs 315. As shown, there may be one RB within 1 MHz.

Figure 4:
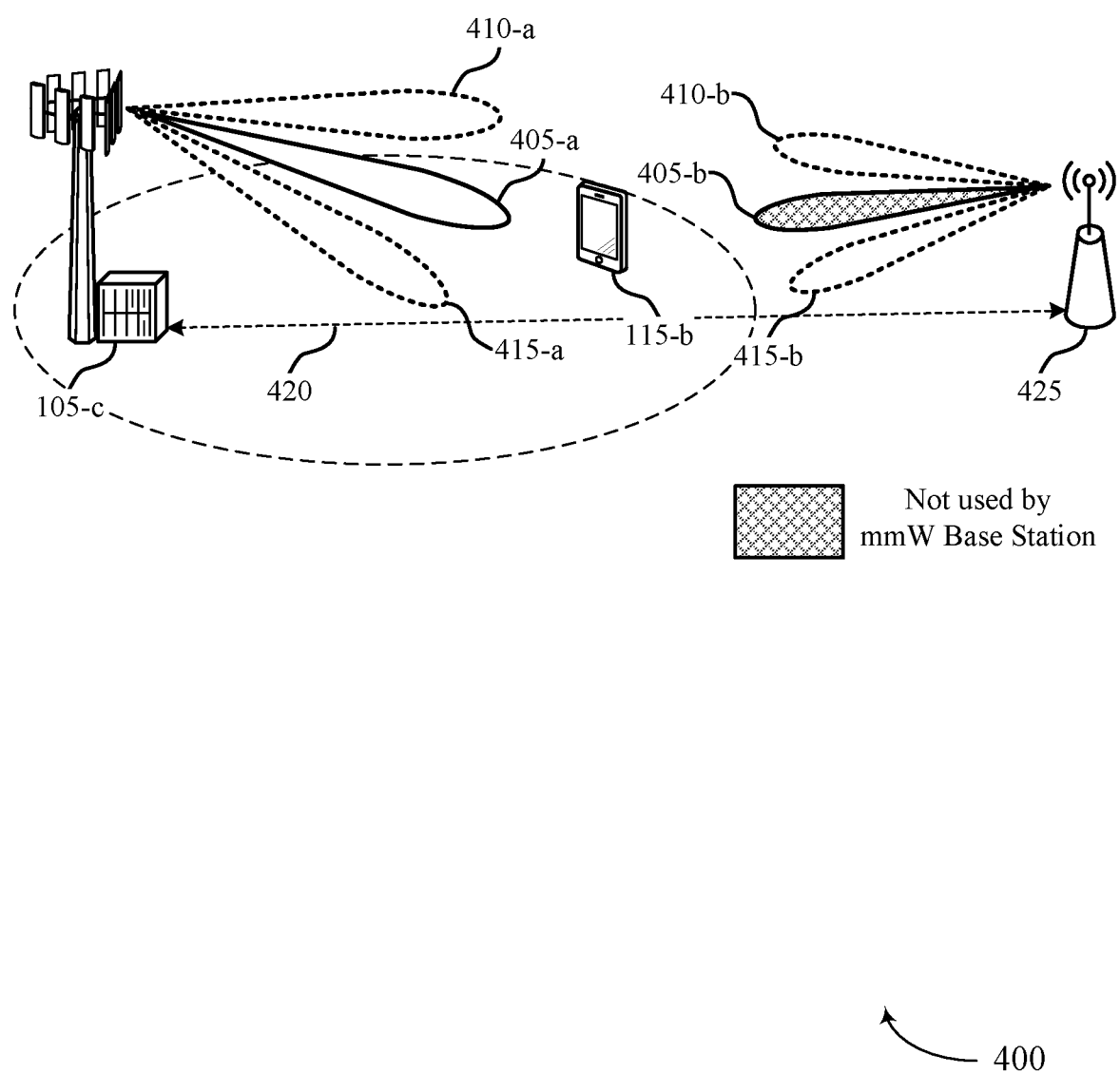
FIG. 4 illustrates an example of an out-of-band preamble transmission that supports enhanced downlink control information detection in accordance with aspects of the present disclosure.

FIG. 4 illustrates an example of an out-of-band preamble transmission 400 that supports enhanced downlink control information detection in accordance with aspects of the present disclosure. In some examples, out-of-band preamble transmission 400 may implement aspects of wireless communications system 100. Out-of-band preamble transmission 400 includes base station 105-*c* and UE 115-*b*, which may be respective examples of a base station 105 and a UE 115. Base station 105-*c* may be referred to as a TRP, or a low-band base station. Out-of-band preamble transmission 400 also includes mmW TRP 425, which may be another example of a TRP as described herein.

As described with reference to FIG. 2, if a TRP passes LBT, the TRP may transmit a preamble before PDCCH transmission. The preamble may include a unique preamble sequence associated with a control resource set carrying low latency PDCCH information. If the receiving UE 115 detects the preamble and identifies the preamble sequence, the UE 115 may combine PDCCH from the corresponding control resource set. The preamble may be an example of an RRQ signal, and the preamble may have a different numerology (e.g., larger SCS, etc.) than PDCCH. In some cases, the UE 115 may transmit an in-band preamble or out-of-band preamble, or both. For example, the UE 115 may transmit a clear-to-send (CTS) or a reservation response (RRS).

For example, base station 105-*c* may pass LBT, and base station 105-*c* may transmit a preamble to UE 115-*b* on band 405-*a*. Band 405-*a* may be a shared radio frequency spectrum band. The preamble may include a preamble sequence associated with a control resource set on which base station 105-*c* may transmit PDCCH information. UE 115-*b* may receive the preamble on band 405-*a*, identify the preamble sequence, and determine to combine the PDCCH information from the control resource set associated with the preamble sequence.

In some cases, to assist in detection of the preamble, base station 105-c may transmit out-of-band preambles on upper bandwidth part (BWP) 410-a and lower BWP 415-a. Upper BWP 410-a and lower BWP 415-a may be a part of the same carrier as band 405-a. A duration of the preamble may be based on the frequency gap between a center frequency of band 405-a and upper BWP 410-a, or a gap between the center frequency of band 405-a and lower BWP 415-b. A larger frequency gap may result in a longer retuning time for UE 115-b. Thus, base station 105-c may transmit a longer preamble for larger frequency gaps.

In some cases, the out-of-band preamble can be transmitted by another TRP, such as mmW TRP 425. Base station 105-c may pass LBT, UE 115-b may be in sync with mmW TRP 425. Base station 105-c may indicate to the mmW TRP 425 of the LBT success via backhaul link 420, which may be an example of an X2 connection. The mmW TRP 425 may transmit a preamble including the preamble sequence which indicates that base station 105-c passed LBT, and the control resource set corresponding to the preamble sequence is valid for PDCCH combining. In some cases, the mmW TRP 425 may transmit the preamble on upper BWP 410-b and lower BWP 415-b. In some cases, the mmW TRP 425 may not transmit the preamble on band 405-b.

For downlink signaling (e.g., RRQ or RTS), base station 105-c may configure semi-persistent scheduling for UE 115-b, and for uplink signaling (e.g., RRS or CTS), base station 105-c may configure grant free uplink resources. The base station 105 may indicate the allocated resources to neighboring cells, including the mmW TRP 425. The neighboring cells may preempt these resources and not schedule other UEs 115 for these resources. To improve detectability of the RRS, UE 115-b may transmit the RRS in-band and out-of-band. For example, UE 115-b receives an RRQ from base station 105-c, and UE 115-b may transmit the RRS on band 405-a, upper BWP 410-a, and lower BWP 415-a in response.

Figure 5:
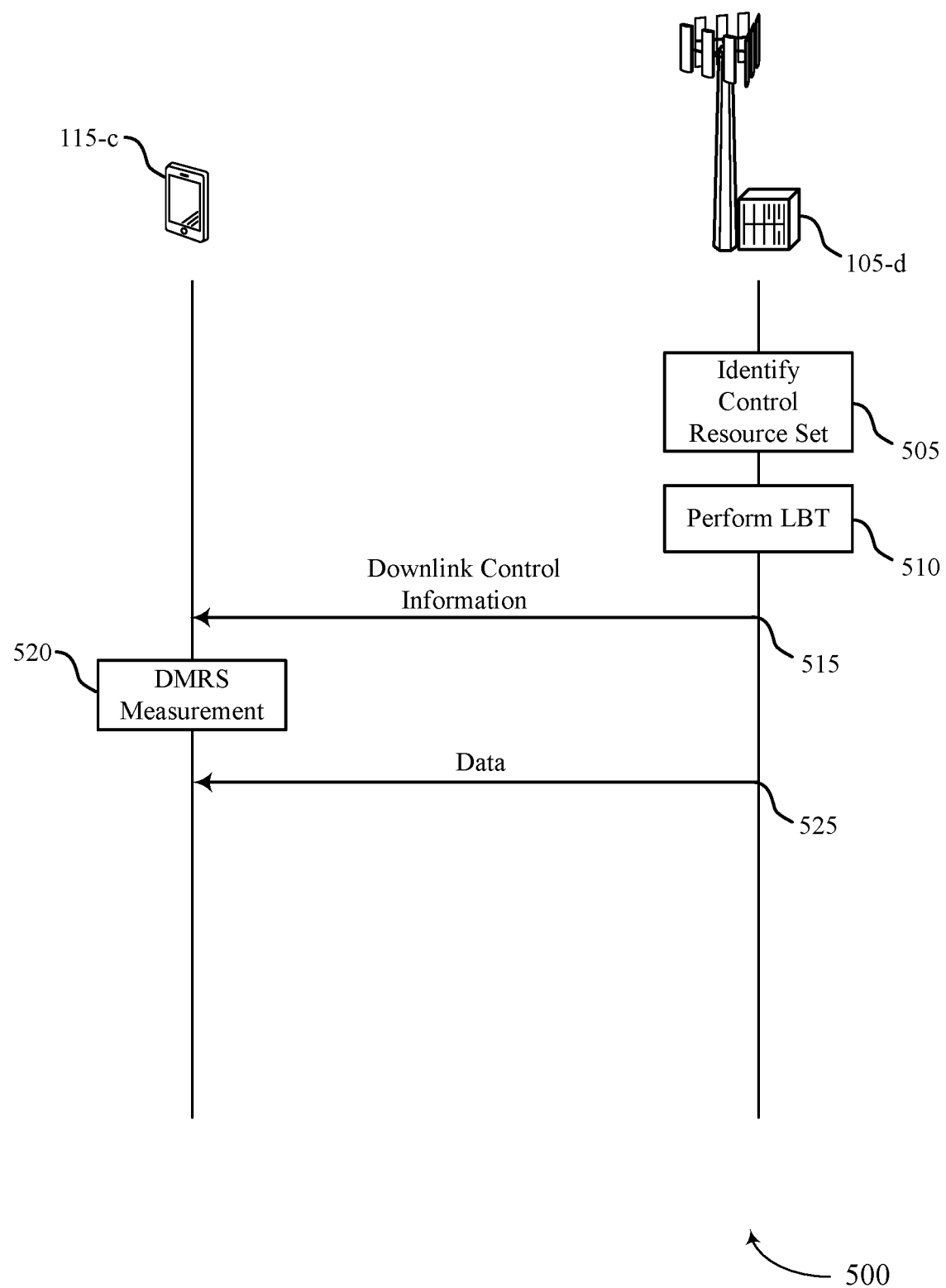
FIGS. 5 and 6 illustrate examples of process flows that support enhanced downlink control information detection in accordance with aspects of the present disclosure.

FIG. 5 illustrates an example of a process flow 500 that supports enhanced downlink control information detection in accordance with aspects of the present disclosure. In some examples, process flow 500 may implement aspects of wireless communications system 100. Process flow 500 may include base station 105-d and UE 115-c, which may be respective examples of a base station 105 and a UE 115. Base station 105-d may be an example of a TRP as described herein.

At 505, base station 105-d may identify a control resource set of a set of control resource sets for downlink control information, where the control resource set is specific to base station 105-d. Base station 105-d may perform an LBT procedure at 510. If the LBT is successful, at 515, base station 105-d may transmit the downlink control information to UE 115-c on a shared radio frequency spectrum band using the control resource set specific to base station 105-d. In some cases, base station 105-d may transmit the downlink control information with a boosted transmission power.

At 520, UE 115-c may perform a DMRS measurement on the shared radio frequency spectrum band for each TRP of a set of TRPs, where each TRP is associated with a control resource set of the set of control resource sets for downlink control information. UE 115-c may determine frequency resources for the DMRS measurement for each TRP based at on a cell ID of base station 105-d or UE type of UE 115-c (e.g., multimedia broadcast (MMB) or low latency).

UE 115-c may receive the downlink control information transmitted by base station 105-d using the control resource set specific to base station 105-d, and UE 115-c may select that control resource set based on the DMRS measurement. For example, UE 115-c may detect a DMRS transmitted by base station 105-d and determine the DMRS measurement was successful. UE 115-c may then determine that the control resource set associated with base station 105-d can be combined for PDCCH decoding.

At 525, base station 105-d may transmit downlink data, and UE 115-c may receive the downlink data transmission, based on the downlink control information.

Figure 6:
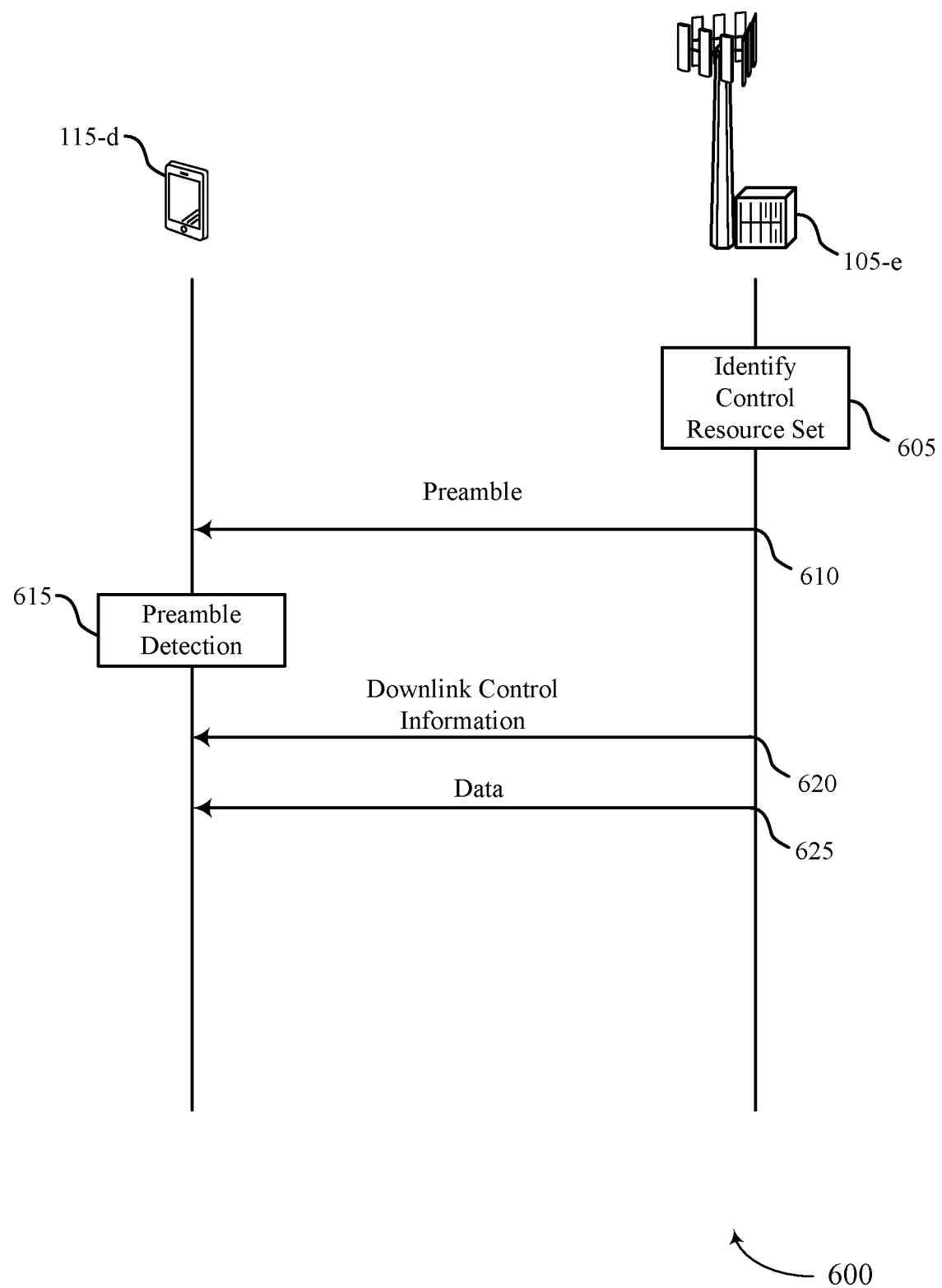

FIG. 6 illustrates an example of a process flow 600 that supports enhanced downlink control information detection in accordance with aspects of the present disclosure. In some examples, process flow 600 may implement aspects of wireless communications system 100. Process flow 600 may include base station 105-e and UE 115-d, which may be respective examples of a base station 105 and a UE 115. Base station 105-e may be an example of a TRP as described herein.

At 605, base station 105-e may identify a control resource set of a set of control resource sets for downlink control information. At 610, base station 105-e may transmit, to UE 115-d, a preamble for the downlink control information on a shared radio frequency spectrum band. The preamble may include a unique preamble specific to the control resource set. A TRP that passes LBT may transmit a preamble prior to transmitting PDCCH.

UE 115-d may perform a preamble detection procedure on a shared radio frequency spectrum band for multiple TRPs, including base station 105-e, at 615. Each TRP of the multiple TRPs may be associated with a control resource set of the set of control resource sets for downlink control information. The preamble detection procedure may be based on a unique preamble sequence for each control set. For example, UE 115-d may detect the preamble unique to base station 105-e in the preamble transmitted at 610, and UE 115-d may select the control resource set associated with base station 105-e for combining based on the detection.

At 620, base station 105-e may transmit downlink control information on the shared radio frequency spectrum band using the control resource set based on the preamble. At 625, base station 105-e may transmit data based on the downlink control information.

Figure 7:
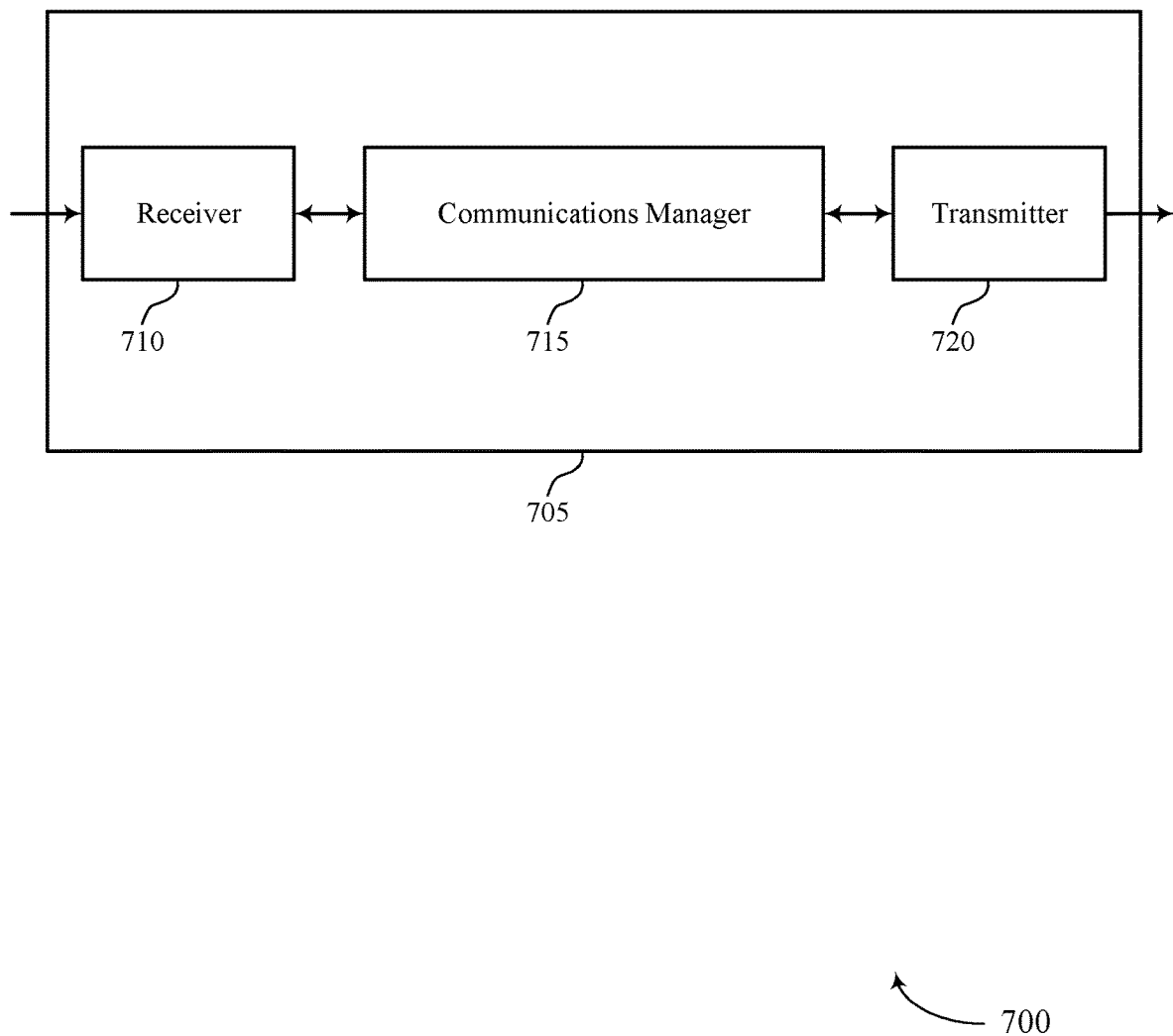
FIGS. 7 and 8 show block diagrams of devices that support enhanced downlink control information detection in accordance with aspects of the present disclosure.

FIG. 7 shows a block diagram 700 of a device 705 that supports enhanced downlink control information detection in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to enhanced downlink control information detection, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may perform a DMRS measurement on a shared radio frequency spectrum band for each TRP of a set of TRPs, where each TRP of the set of TRPs is associated with a control resource set of a set of control resource sets for downlink control information, receive the downlink control information using one or more control resource sets of the set of control resource sets, the one or more control resource sets selected based on the DMRS measurement, and receive a downlink data transmission based on the downlink control information. The communications manager 715 may also perform a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receive the downlink control information using one or more control resource sets of the set of control resource sets; the one or more control resource sets selected based on the preamble detection procedure, and receive a data transmission based on the downlink control information. The communications manager 715 may be an example of aspects of the communications manager 1010 described with reference to FIG. 10.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
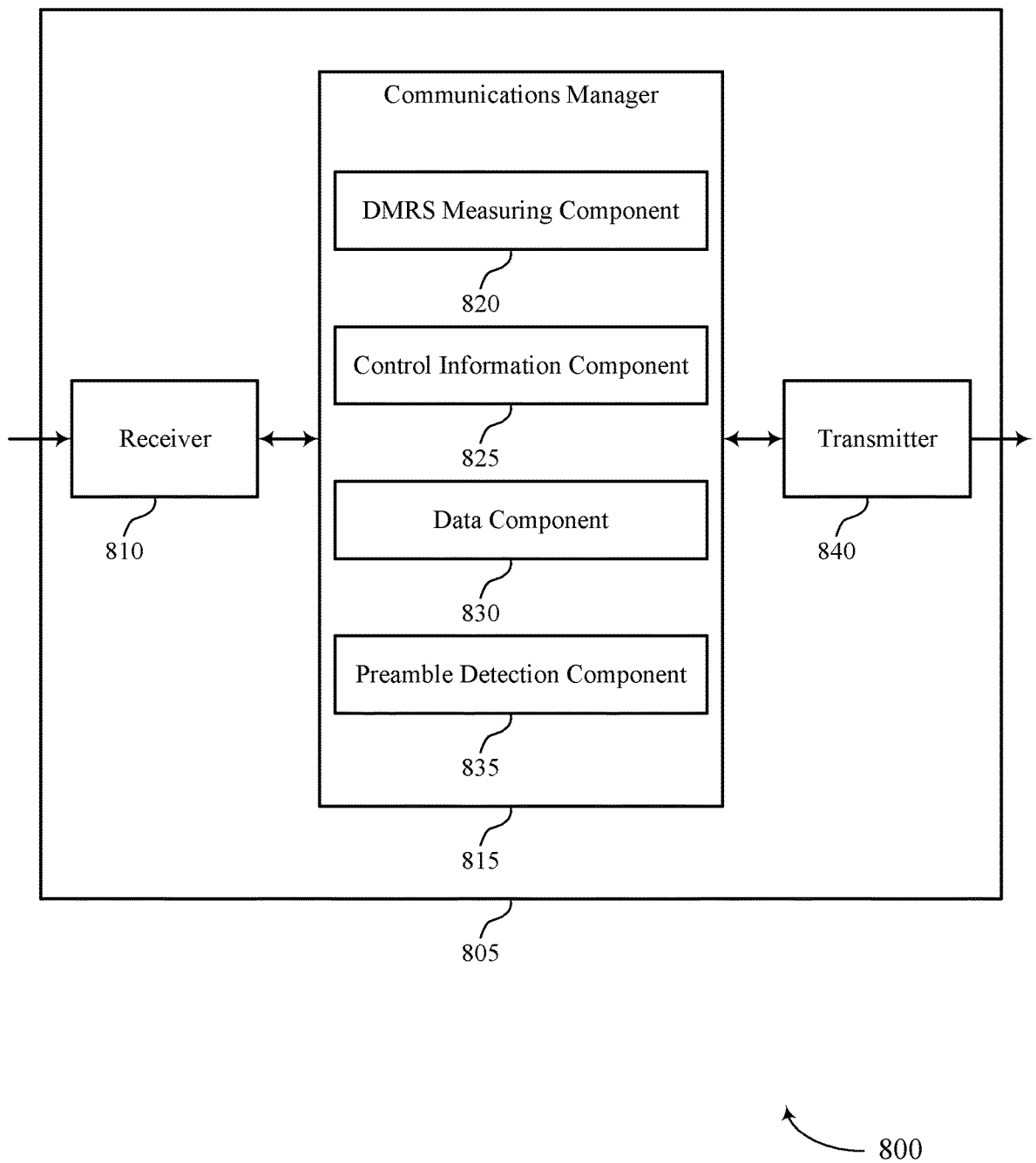

FIG. 8 shows a block diagram 800 of a device 805 that supports enhanced downlink control information detection in accordance with aspects of the present disclosure. The device 805 may be an example of aspects of a device 705 or a UE 115 as described with reference to FIGS. 1 and 7. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to enhanced downlink control information detection, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described with reference to FIG. 7. The communications manager 815 may include a DMRS measuring component 820, a control information component 825, a data component 830, and a preamble detection component 835. The communications manager 815 may be an example of aspects of the communications manager 1010 described with reference to FIG. 10.

The DMRS measuring component 820 may perform a DMRS measurement on a shared radio frequency spectrum band for each TRP of a set of TRPs, where each TRP of the set of TRPs is associated with a control resource set of a set of control resource sets for downlink control information.

The control information component 825 may receive the downlink control information using one or more control resource sets of the set of control resource sets, the one or more control resource sets selected based on the DMRS measurement.

The data component 830 may receive a downlink data transmission based on the downlink control information.

The preamble detection component 835 may perform a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set.

The control information component 825 may receive the downlink control information using one or more control resource sets of the set of control resource sets; the one or more control resource sets selected based on the preamble detection procedure. The data component 830 may receive a data transmission based on the downlink control information.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
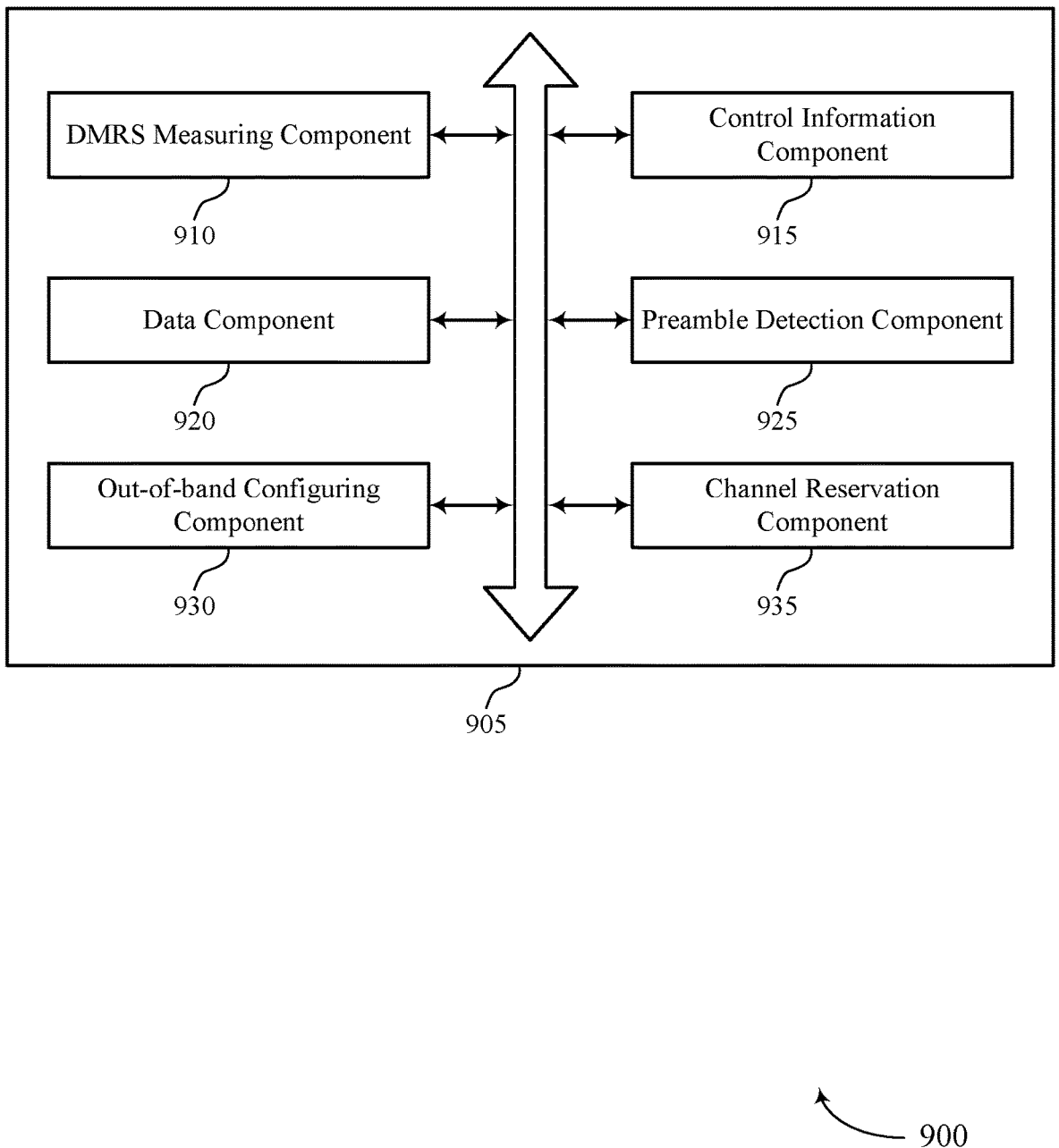
FIG. 9 shows a block diagram of a communications manager that supports enhanced downlink control information detection in accordance with aspects of the present disclosure.

FIG. 9 shows a block diagram 900 of a communications manager 905 that supports enhanced downlink control information detection in accordance with aspects of the present disclosure. The communications manager 905 may be an example of aspects of a communications manager 715, a communications manager 815, or a communications manager 1010 described with reference to FIGS. 7, 8, and 10. The communications manager 905 may include a DMRS measuring component 910, a control information component 915, a data component 920, a preamble detection component 925, an out-of-band configuring component 930, and a channel reservation component 935. Each of these modules may communicate, directly or indirectly, with one another (e.g., via one or more buses).

The DMRS measuring component 910 may perform a DMRS measurement on a shared radio frequency spectrum band for each TRP of a set of TRPs, where each TRP of the set of TRPs is associated with a control resource set of a set of control resource sets for downlink control information.

In some examples, the DMRS measuring component 910 may determine frequency resources for the DMRS measurement for each TRP based one of: a cell ID of the TRP or a type of the UE. In some examples, the DMRS measuring component 910 may perform the DMRS measurement for each TRP on a set of REs configured for DMRS transmission within an REG. In some cases, the set of REs configured for DMRS transmission includes at least one of a third RE of the REG, a seventh RE of the REG, and an eleventh RE of the REG.

The control information component 915 may receive the downlink control information using one or more control resource sets of the set of control resource sets, the one or more control resource sets selected based on the DMRS measurement.

In some examples, the control information component 915 may receive the downlink control information using one or more control resource sets of the set of control resource sets, the one or more control resource sets selected based on the preamble detection procedure.

In some examples, the control information component 915 may determine the DMRS measurement is successful for the one or more control resource sets, where selecting the one or more control resource sets is based on the determining. In some examples, the control information component 915 may determine frequency resources for the control resource set associated with each TRP of the set of TRPs based on at least one of: a cell ID of the TRP or a type of the UE.

In some examples, the control information component 915 may receive the downlink control information on a set of REs configured for downlink control information within a REG. In some cases, the set of REs configured for downlink control information transmission includes at least one of: a third RE of the REG, a seventh RE of the REG, and an eleventh RE of the REG.

In some examples, the control information component 915 may determine that the preamble detection procedure is successful for the one or more control resource sets. In some examples, the control information component 915 may select the one or more control resource sets based on the determining. The data component 920 may receive a downlink data transmission based on the downlink control information.

The preamble detection component 925 may perform a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set.

In some examples, the preamble detection component 925 may detect, for at least one control resource set of the set of control resource sets, a first preamble within a bandwidth part of the data transmission and a second preamble outside of the bandwidth part of the data transmission.

The out-of-band configuring component 930 may receive, via RRC signaling, a configuration to perform the preamble detection procedure outside of the bandwidth part of the data transmission. In some cases, a duration of the first preamble is based on a frequency gap between the bandwidth part and a center frequency of the second preamble.

The channel reservation component 935 may transmit a RRS in response to at least one of the preamble and the data transmission. In some examples, the channel reservation component 935 may transmit the RRS occurs at least once within a bandwidth part of the data transmission and at least once outside the bandwidth part of the data transmission. In some cases, a preamble to by detected by the preamble detection procedure may include a RRQ.

Figure 10:
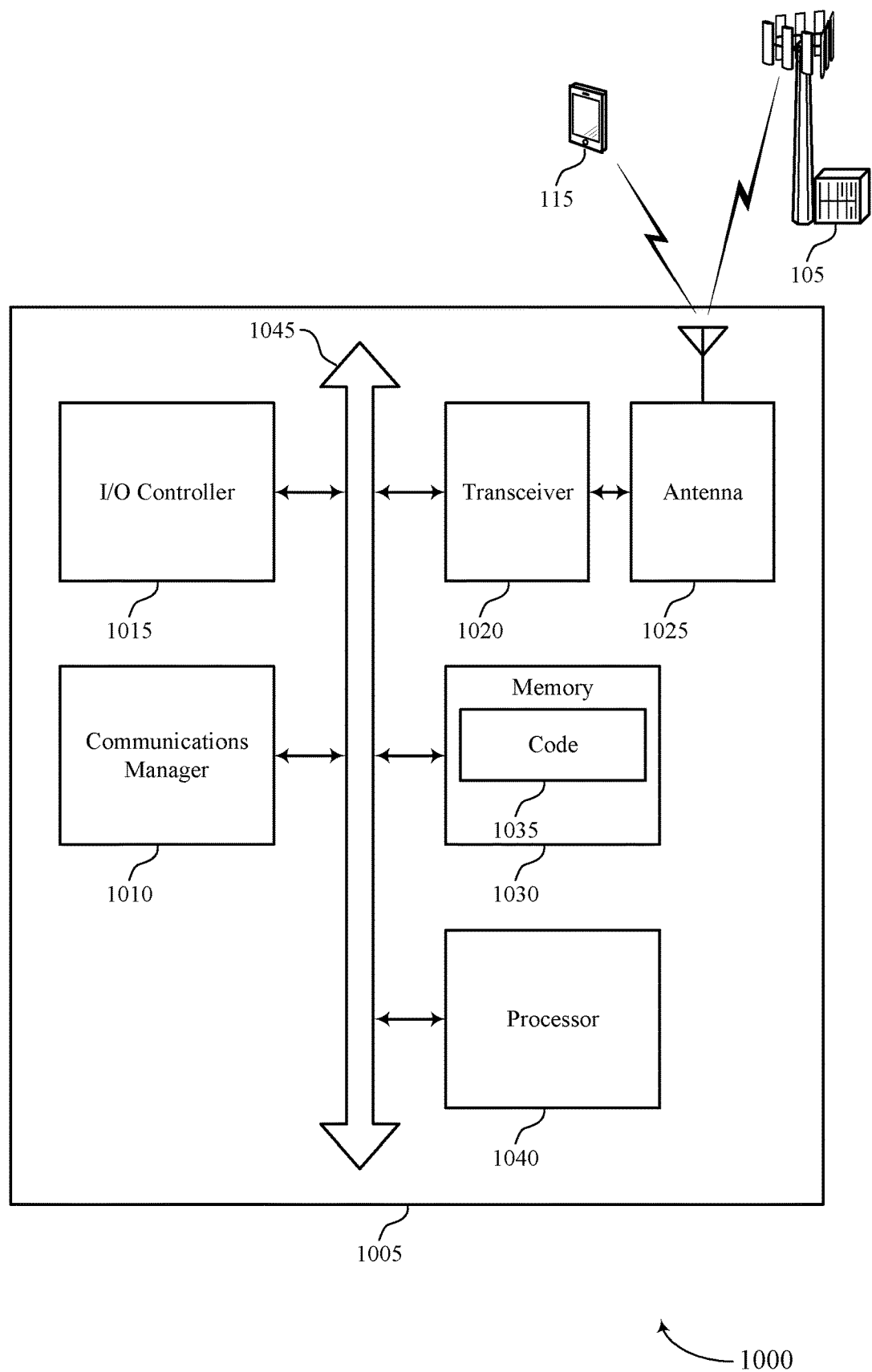
FIG. 10 shows a diagram of a system including a device that supports enhanced downlink control information detection in accordance with aspects of the present disclosure.

FIG. 10 shows a diagram of a system 1000 including a device 1005 that supports enhanced downlink control information detection in accordance with aspects of the present disclosure. The device 1005 may be an example of or include the components of device 705, device 805, or a UE 115 as described above, for example, with reference to FIGS. 1, 7, and 8. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may perform a DMRS measurement on a shared radio frequency spectrum band for each TRP of a set of TRPs, where each TRP of the set of TRPs is associated with a control resource set of a set of control resource sets for downlink control information, receive the downlink control information using one or more control resource sets of the set of control resource sets, the one or more control resource sets selected based on the DMRS measurement, and receive a downlink data transmission based on the downlink control information. The communications manager 1010 may also perform a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set, receive the downlink control information using one or more control resource sets of the set of control resource sets; the one or more control resource sets selected based on the preamble detection procedure, and receive a data transmission based on the downlink control information.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a Basic Input/Output System (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced downlink control information detection).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
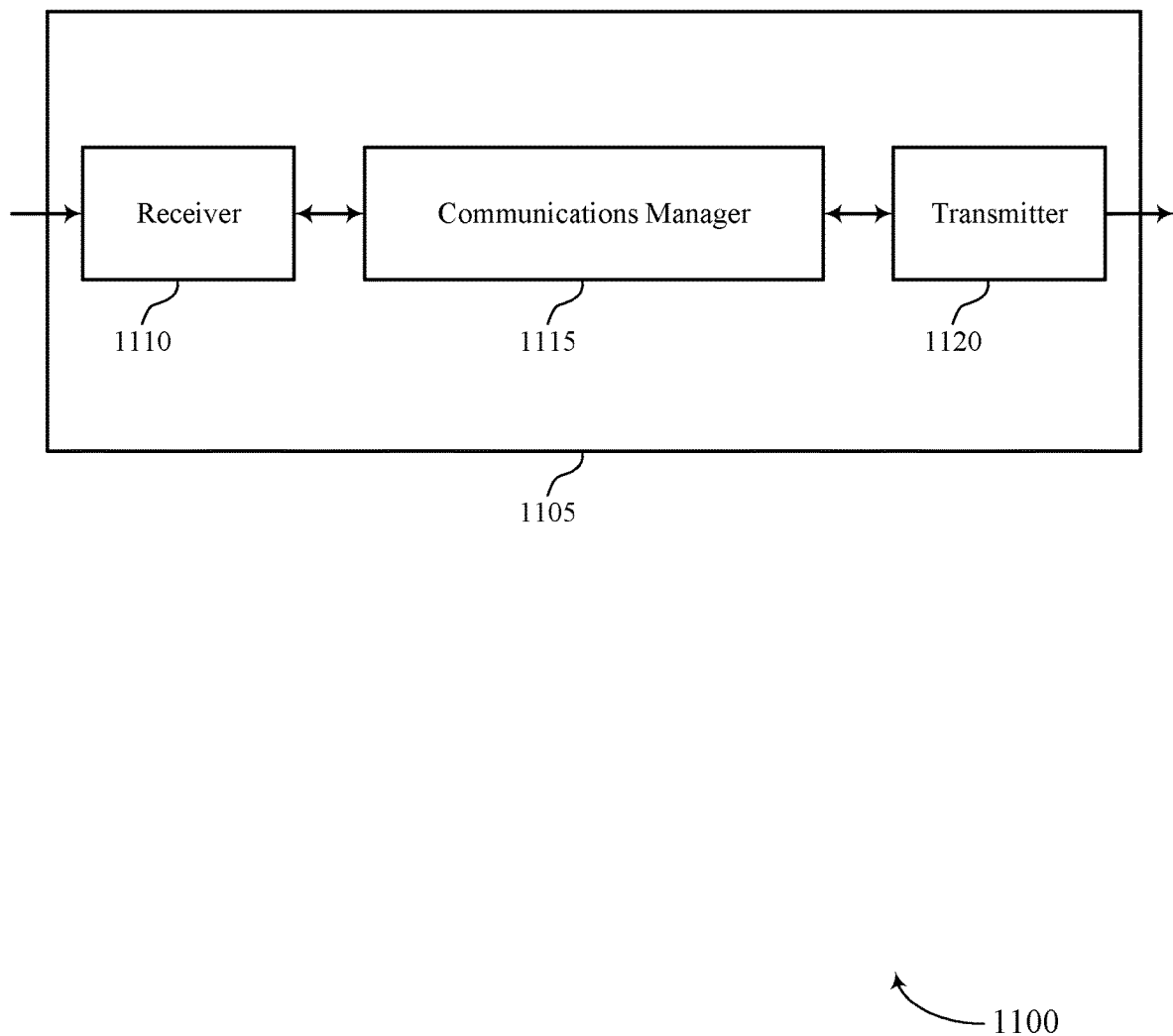
FIGS. 11 and 12 show block diagrams of devices that support enhanced downlink control information detection in accordance with aspects of the present disclosure.

FIG. 11 shows a block diagram 1100 of a device 1105 that supports enhanced downlink control information detection in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to enhanced downlink control information detection, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a control resource set of a set of control resource sets for downlink control information, where the control resource set is specific to the TRP, perform a LBT procedure on a shared radio frequency spectrum band, transmit, to a UE, the downlink control information on the shared radio frequency spectrum band based on the LBT procedure and using the control resource set specific to the TRP, and transmit data to the UE based on the downlink control information. The communications manager 1115 may also identify a control resource set of a set of control resource sets for downlink control information, transmit, to a UE, a preamble for the downlink control information on a shared radio frequency spectrum band, where the preamble includes a unique preamble sequence specific to the control resource set, transmit the downlink control information on the shared radio frequency spectrum band using the control resource set based on the preamble, and transmit data based on the downlink control information. The communications manager 1115 may be an example of aspects of the communications manager 1410 described with reference to FIG. 14.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
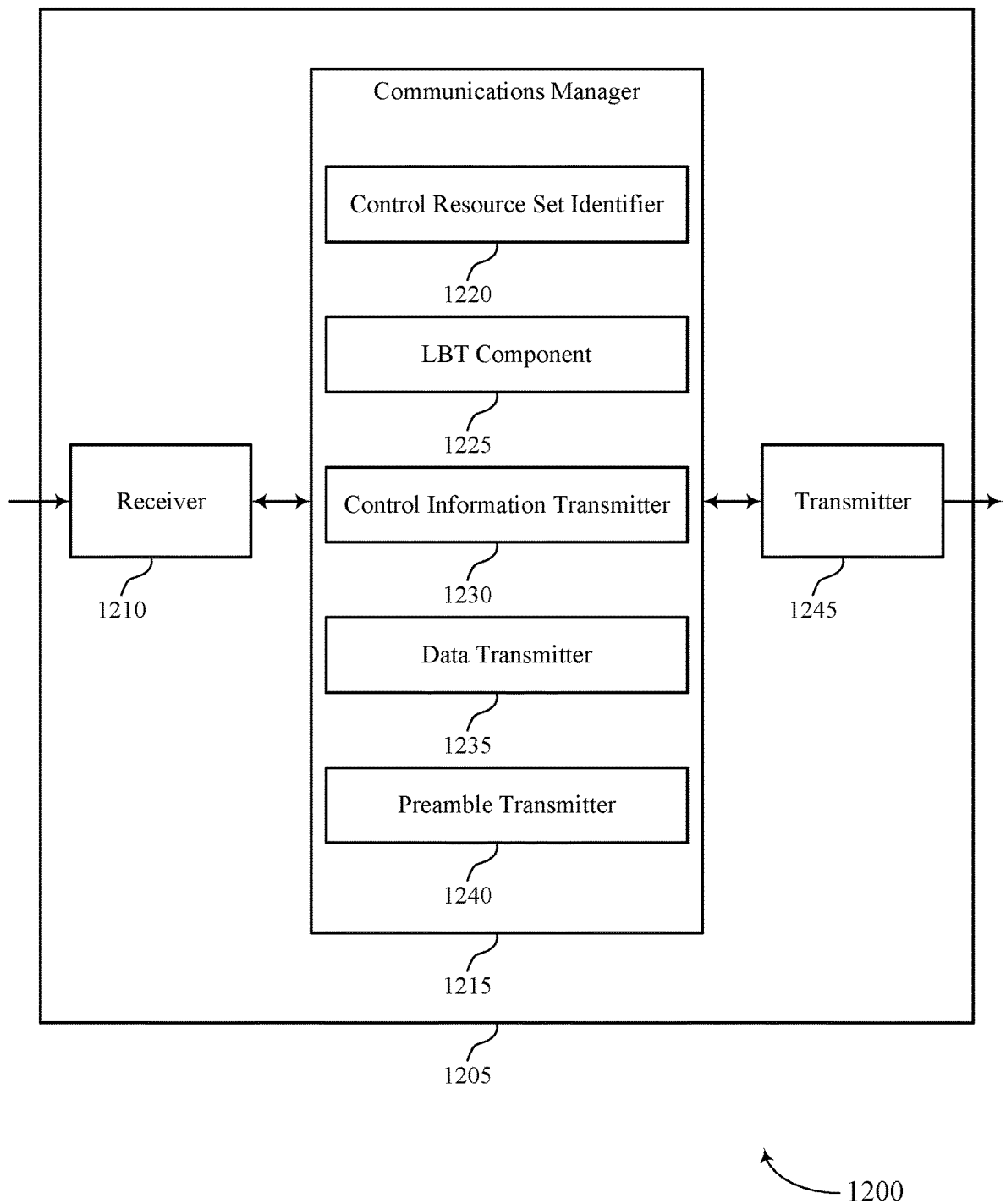

FIG. 12 shows a block diagram 1200 of a device 1205 that supports enhanced downlink control information detection in accordance with aspects of the present disclosure. The device 1205 may be an example of aspects of a device 1105 or a base station 105 as described with reference to FIGS. 1 and 11. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to enhanced downlink control information detection, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described with reference to FIG. 11. The communications manager 1215 may include a control resource set identifier 1220, a LBT component 1225, a control information transmitter 1230, a data transmitter 1235, and a preamble transmitter 1240. The communications manager 1215 may be an example of aspects of the communications manager 1410 described with reference to FIG. 14.

The control resource set identifier 1220 may identify a control resource set of a set of control resource sets for downlink control information, where the control resource set is specific to the TRP. The LBT component 1225 may perform a LBT procedure on a shared radio frequency spectrum band. The control information transmitter 1230 may transmit, to a UE 115, the downlink control information on the shared radio frequency spectrum band based on the LBT procedure and using the control resource set specific to the TRP. The data transmitter 1235 may transmit data to the UE 115 based on the downlink control information.

In some examples, the control resource set identifier 1220 may identify a control resource set of a set of control resource sets for downlink control information. The preamble transmitter 1240 may transmit, to a UE 115, a preamble for the downlink control information on a shared radio frequency spectrum band, where the preamble includes a unique preamble sequence specific to the control resource set. The control information transmitter 1230 may transmit the downlink control information on the shared radio frequency spectrum band using the control resource set based on the preamble. The data transmitter 1235 may transmit data based on the downlink control information.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
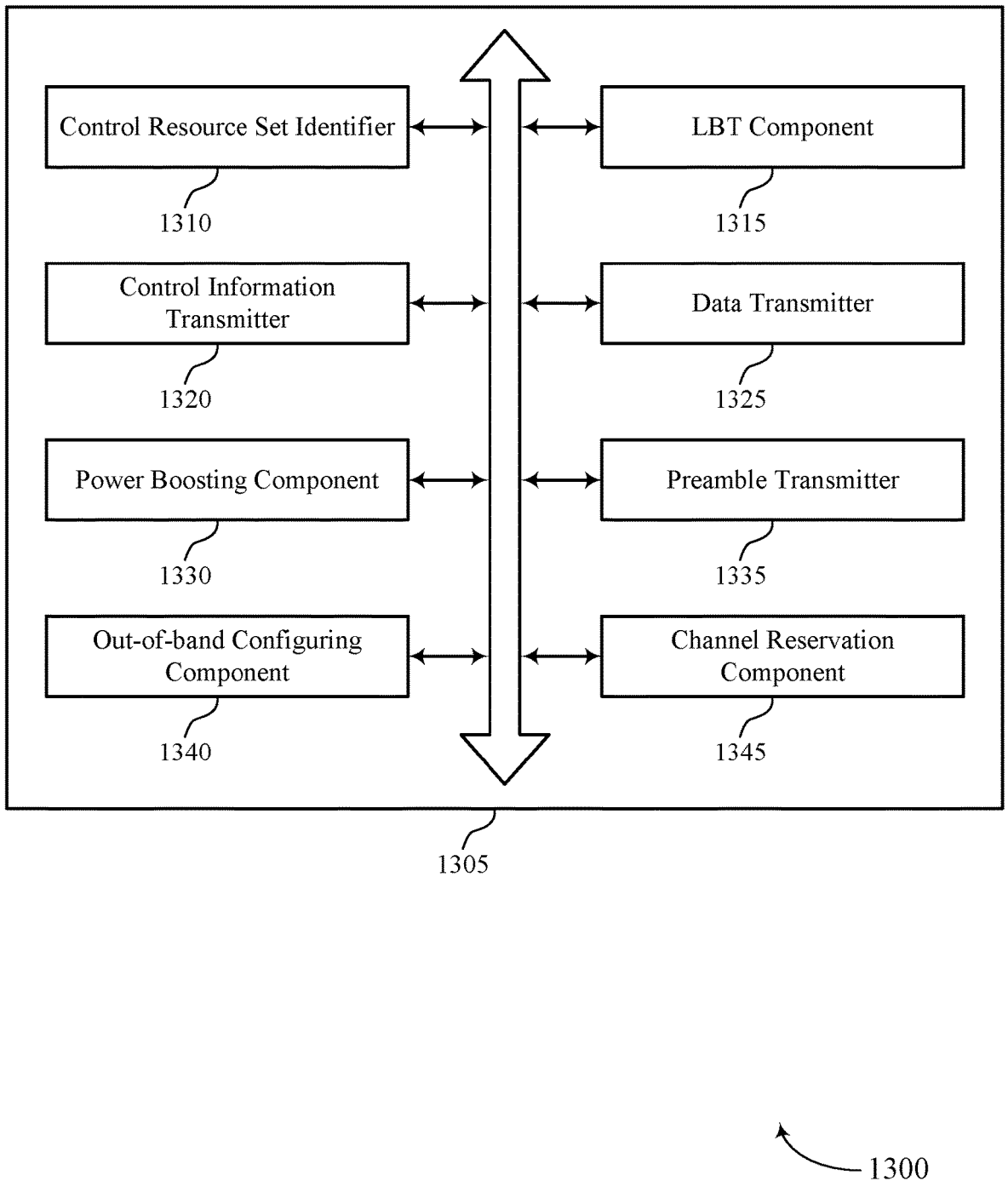
FIG. 13 shows a block diagram of a communications manager that supports enhanced downlink control information detection in accordance with aspects of the present disclosure.

FIG. 13 shows a block diagram 1300 of a communications manager 1305 that supports enhanced downlink control information detection in accordance with aspects of the present disclosure. The communications manager 1305 may be an example of aspects of a communications manager 1115, a communications manager 1215, or a communications manager 1410 described with reference to FIGS. 11, 12, and 14. The communications manager 1305 may include a control resource set identifier 1310, a LBT component 1315, a control information transmitter 1320, a data transmitter 1325, a power boosting component 1330, a preamble transmitter 1335, an out-of-band configuring component 1340, and a channel reservation component 1345. Each of these modules may communicate, directly or indirectly, with one another (e.g., via one or more buses).

The control resource set identifier 1310 may identify a control resource set of a set of control resource sets for downlink control information, where the control resource set is specific to the TRP. In some examples, the control resource set identifier 1310 may identify a control resource set of a set of control resource sets for downlink control information.

The LBT component 1315 may perform a LBT procedure on a shared radio frequency spectrum band. In some examples, the LBT component 1315 may transmit, via a backhaul connection to a second TRP, an indication of a successful LBT procedure. The preamble transmitter 1335 may transmit a first preamble within a bandwidth part of the data transmission, where the indication includes a request for the second TRP to transmit a second preamble outside of the bandwidth part of the data transmission.

The control information transmitter 1320 may transmit, to a UE 115, the downlink control information on the shared radio frequency spectrum band based on the LBT procedure and using the control resource set specific to the TRP. In some examples, the control information transmitter 1320 may transmit the downlink control information on the shared radio frequency spectrum band using the control resource set based on the preamble.

In some examples, the control information transmitter 1320 may transmit a DMRS. In some examples, the control information transmitter 1320 may select frequency resources for transmitting the DMRS based on at least one of: a cell ID of the TRP or a type of the UE. In some cases, the DMRS is transmitted on a set of REs configured for DMRS transmission within an REG.

In some examples, the control information transmitter 1320 may determine frequency resources for the control resource set associated with the TRP based on at least one of: a cell ID of the TRP or a type of the UE. In some examples, the control information transmitter 1320 may transmit the downlink control information on a set of REs configured for downlink control information within an REG. In some cases, the set of REs configured for downlink control information transmission includes at least one of: a third RE of the REG, a seventh RE of the REG, and an eleventh RE of the REG. The data transmitter 1325 may transmit data to the UE based on the downlink control information.

The preamble transmitter 1335 may transmit, to a UE 115, a preamble for the downlink control information on a shared radio frequency spectrum band, where the preamble includes a unique preamble sequence specific to the control resource set. In some examples, the preamble transmitter 1335 may transmit a first preamble within a bandwidth part of the data transmission and a second preamble outside of the bandwidth part of the data transmission.

The power boosting component 1330 may boost a transmission power of the downlink control information with a boosted transmission power. In some examples, the power boosting component 1330 may select REs for the downlink control information transmission based on the boosted transmission power.

The out-of-band configuring component 1340 may transmit, via RRC signaling, a configuration to perform a preamble detection procedure outside of the bandwidth part. In some cases, a duration of the first preamble is based on a frequency gap between the bandwidth part and a center frequency of the second preamble.

The channel reservation component 1345 may receive a RRS in response to at least one of the preamble and the data transmission. In some examples, the channel reservation component 1345 may receive the RRS occurs at least once within a bandwidth part of the data transmission and at least once outside the bandwidth part of the data transmission. In some cases, the preamble includes an RRQ.

Figure 14:
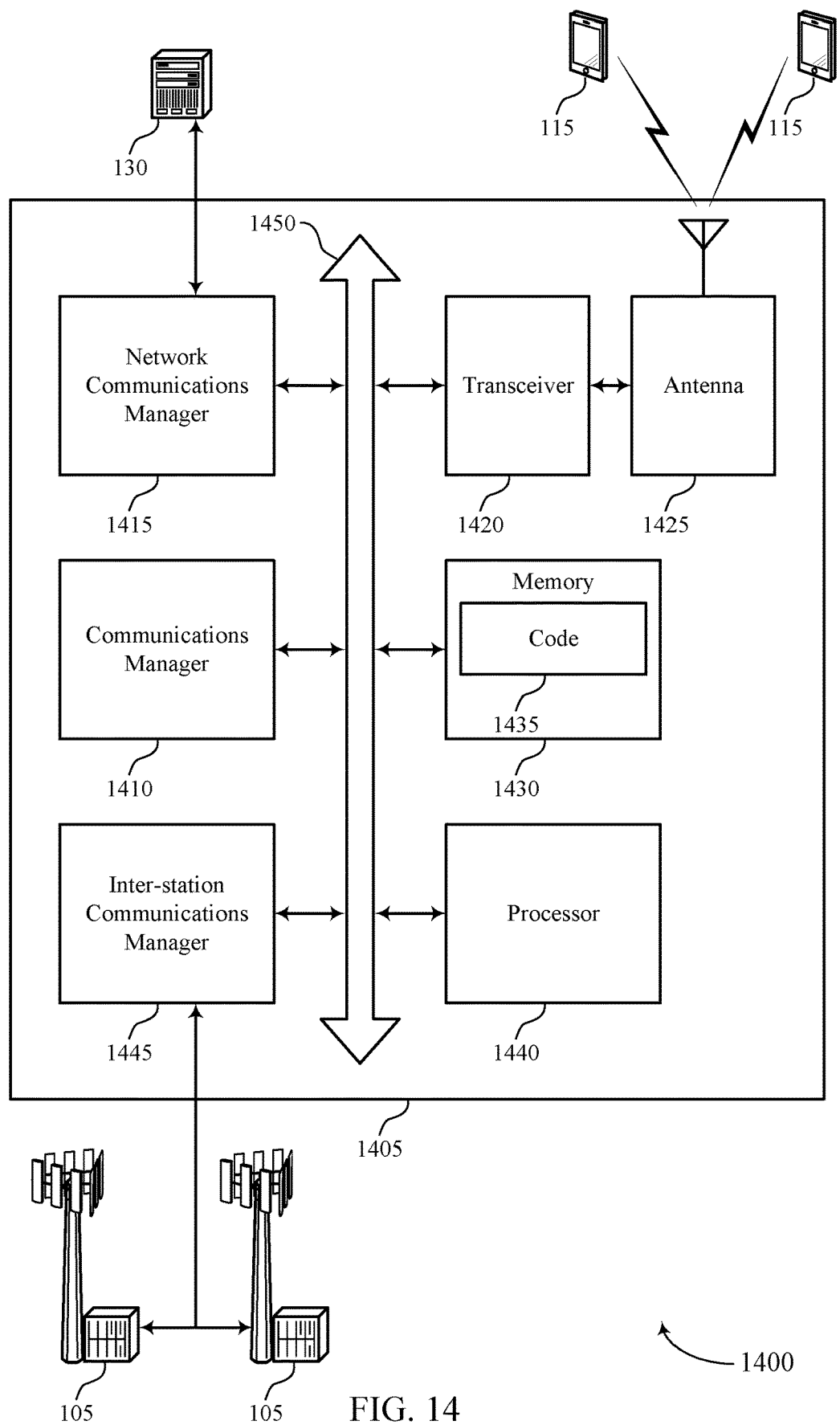
FIG. 14 shows a diagram of a system including a device that supports enhanced downlink control information detection in accordance with aspects of the present disclosure.

FIG. 14 shows a diagram of a system 1400 including a device 1405 that supports enhanced downlink control information detection in accordance with aspects of the present disclosure. The device 1405 may be an example of or include the components of device 1105, device 1205, or a base station 105 as described above, for example, with reference to FIGS. 1, 11, and 12. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a control resource set of a set of control resource sets for downlink control information, where the control resource set is specific to the TRP, perform a LBT procedure on a shared radio frequency spectrum band, transmit, to a UE, the downlink control information on the shared radio frequency spectrum band based on the LBT procedure and using the control resource set specific to the TRP, and transmit data to the UE based on the downlink control information. The communications manager 1410 may also identify a control resource set of a set of control resource sets for downlink control information, transmit, to a UE, a preamble for the downlink control information on a shared radio frequency spectrum band, where the preamble includes a unique preamble sequence specific to the control resource set, transmit the downlink control information on the shared radio frequency spectrum band using the control resource set based on the preamble, and transmit data based on the downlink control information.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting enhanced downlink control information detection).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
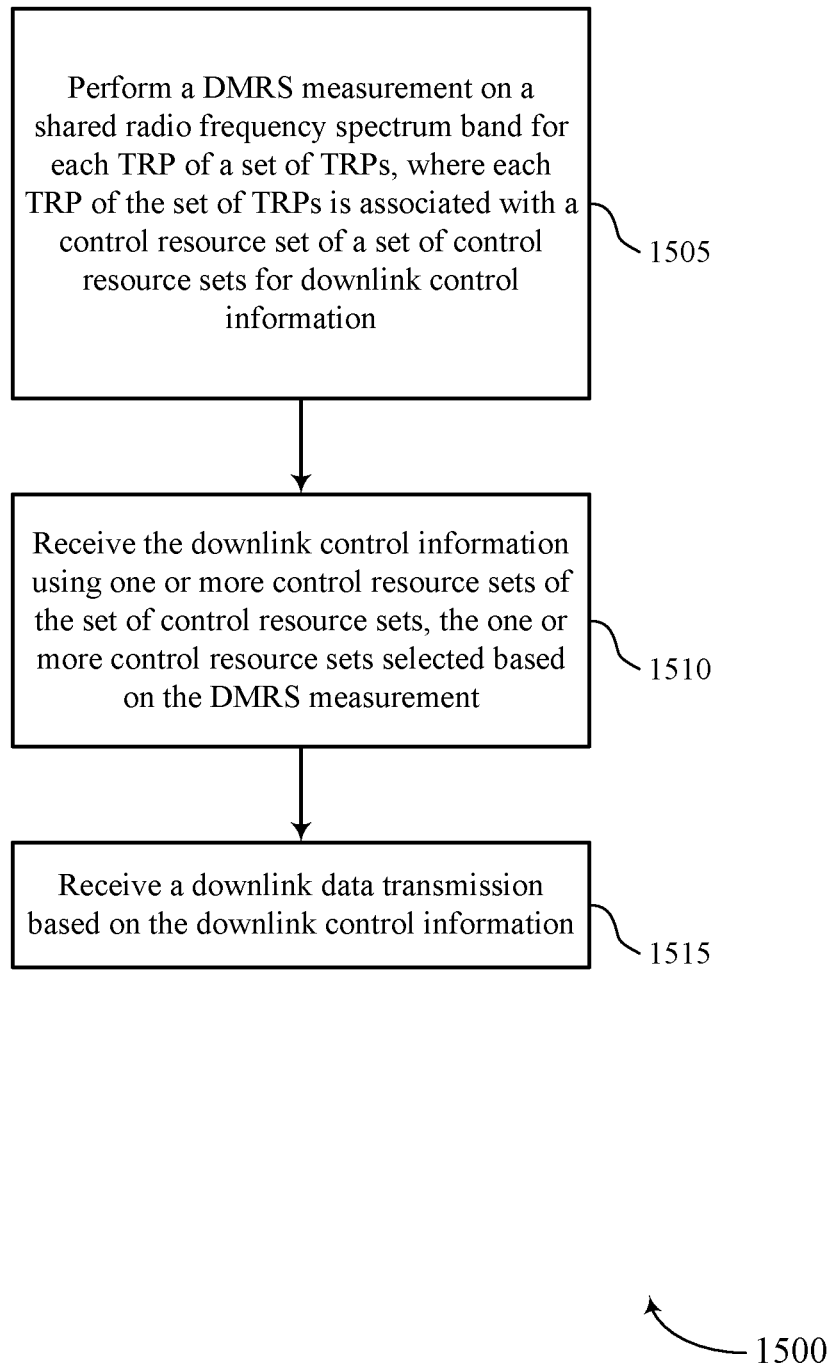
FIGS. 15 through 18 show flowcharts illustrating methods that support enhanced downlink control information detection in accordance with aspects of the present disclosure.

FIG. 15 shows a flowchart illustrating a method 1500 that supports enhanced downlink control information detection in accordance with aspects of the present disclosure. The operations of method 1500 may be implemented by a UE 115 or its components as described herein. For example, the operations of method 1500 may be performed by a communications manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1505, the UE 115 may perform a DMRS measurement on a shared radio frequency spectrum band for each TRP of a set of TRPs, where each TRP of the set of TRPs is associated with a control resource set of a set of control resource sets for downlink control information. The operations of 1505 may be performed according to the methods described herein. In some examples, aspects of the operations of 1505 may be performed by a DMRS measuring component as described with reference to FIGS. 7 to 10.

At 1510, the UE 115 may receive the downlink control information using one or more control resource sets of the set of control resource sets, the one or more control resource sets selected based on the DMRS measurement. The operations of 1510 may be performed according to the methods described herein. In some examples, aspects of the operations of 1510 may be performed by a control information component as described with reference to FIGS. 7 to 10.

At 1515, the UE 115 may receive a downlink data transmission based on the downlink control information. The operations of 1515 may be performed according to the methods described herein. In some examples, aspects of the operations of 1515 may be performed by a data component as described with reference to FIGS. 7 to 10.

Figure 16:
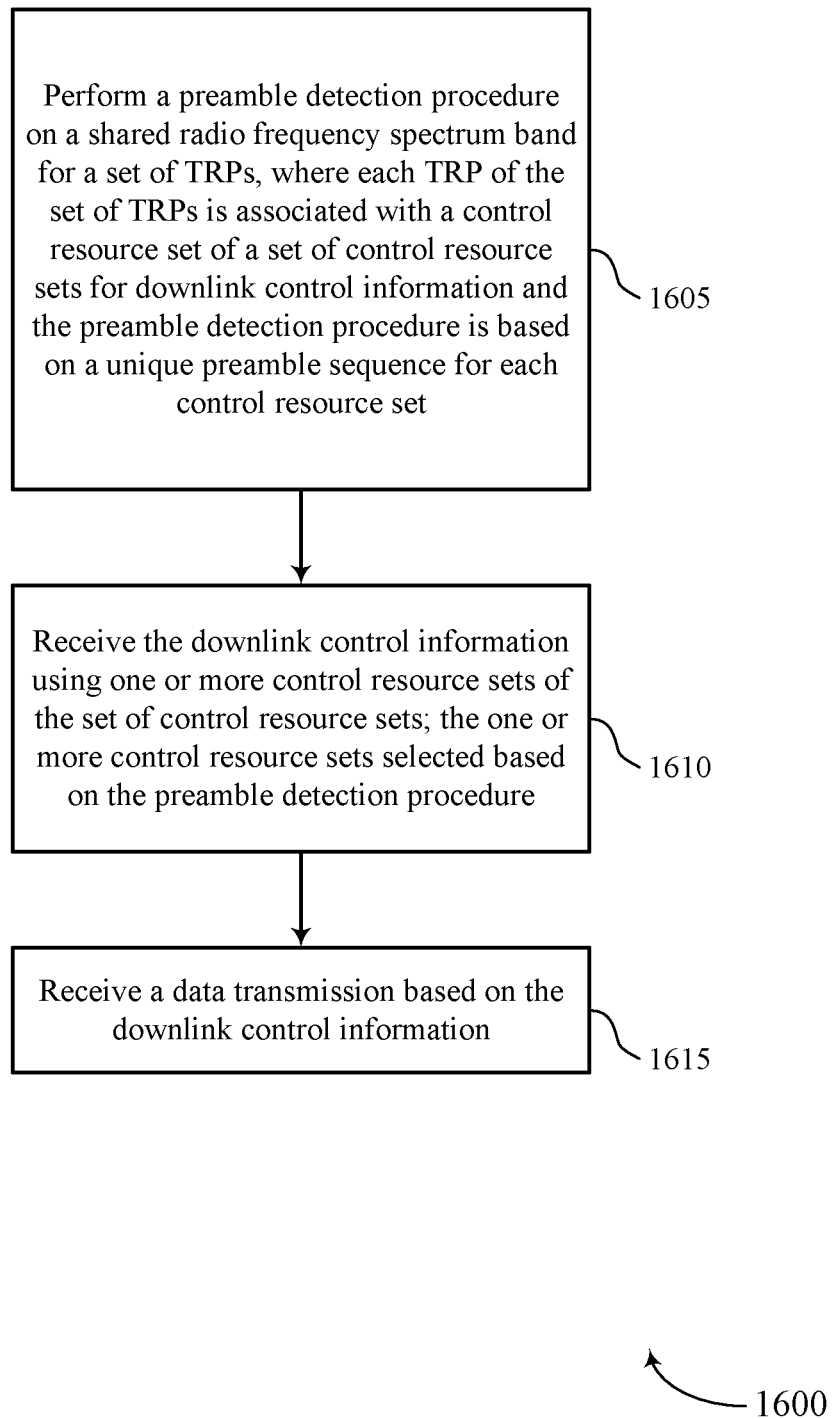

FIG. 16 shows a flowchart illustrating a method 1600 that supports enhanced downlink control information detection in accordance with aspects of the present disclosure. The operations of method 1600 may be implemented by a UE 115 or its components as described herein. For example, the operations of method 1600 may be performed by a communications manager as described with reference to FIGS. 7 to 10. In some examples, a UE may execute a set of instructions to control the functional elements of the UE to perform the functions described below. Additionally or alternatively, a UE may perform aspects of the functions described below using special-purpose hardware.

At 1605, the UE 115 may perform a preamble detection procedure on a shared radio frequency spectrum band for a set of TRPs, where each TRP of the set of TRPs is associated with a control resource set of a set of control resource sets for downlink control information and the preamble detection procedure is based on a unique preamble sequence for each control resource set. The operations of 1605 may be performed according to the methods described herein. In some examples, aspects of the operations of 1605 may be performed by a preamble detection component as described with reference to FIGS. 7 to 10.

At 1610, the UE 115 may receive the downlink control information using one or more control resource sets of the set of control resource sets; the one or more control resource sets selected based on the preamble detection procedure. The operations of 1610 may be performed according to the methods described herein. In some examples, aspects of the operations of 1610 may be performed by a control information component as described with reference to FIGS. 7 to 10.

At 1615, the UE 115 may receive a data transmission based on the downlink control information. The operations of 1615 may be performed according to the methods described herein. In some examples, aspects of the operations of 1615 may be performed by a data component as described with reference to FIGS. 7 to 10.

Figure 17:
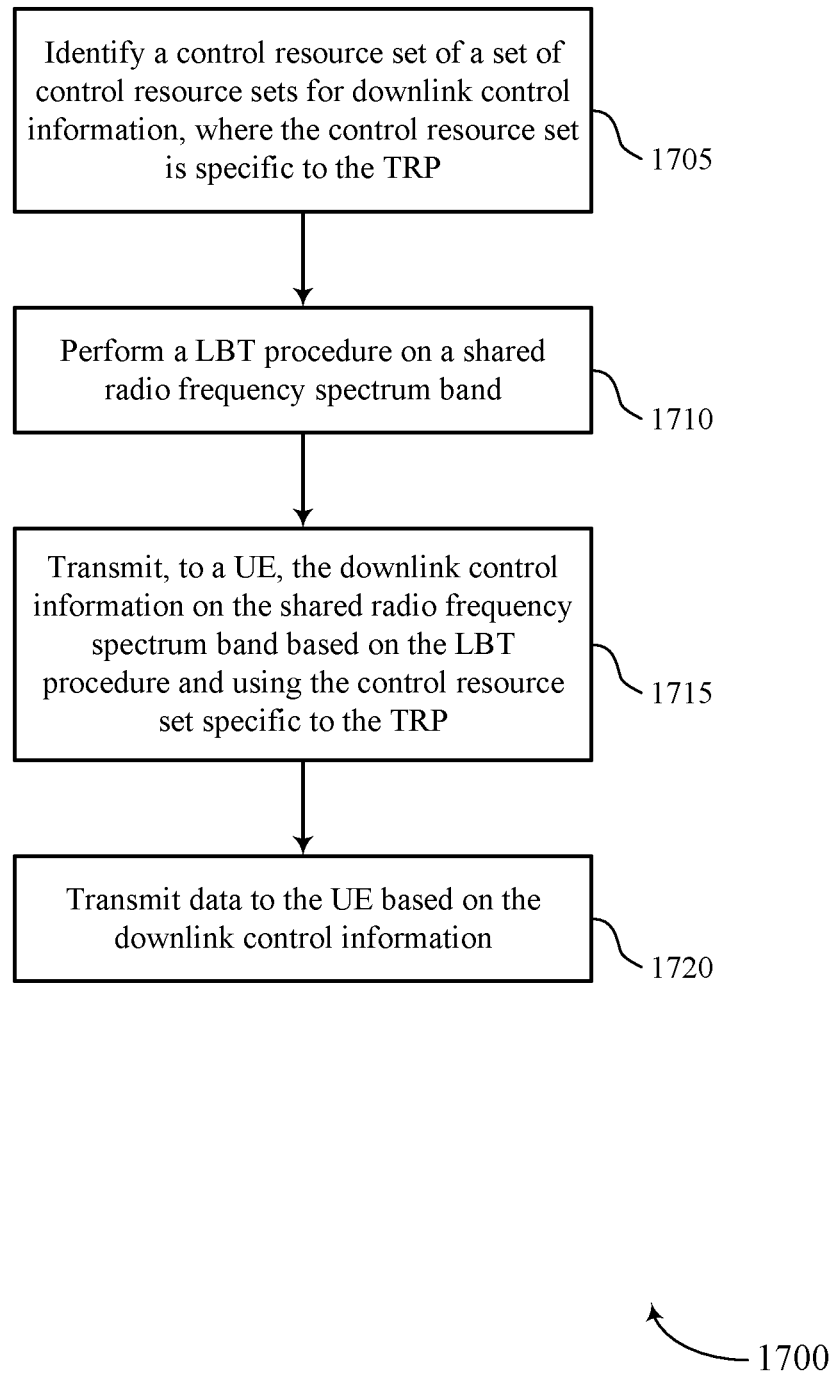

FIG. 17 shows a flowchart illustrating a method 1700 that supports enhanced downlink control information detection in accordance with aspects of the present disclosure. The operations of method 1700 may be implemented by a base station 105 or its components as described herein. For example, the operations of method 1700 may be performed by a communications manager as described with reference to FIGS. 11 to 14. In some examples, a base station may execute a set of instructions to control the functional elements of the base station to perform the functions described below. Additionally or alternatively, a base station may perform aspects of the functions described below using special-purpose hardware.

At 1705, the base station 105 may identify a control resource set of a set of control resource sets for downlink control information, where the control resource set is specific to the TRP. The operations of 1705 may be performed according to the methods described herein. In some examples, aspects of the operations of 1705 may be performed by a control resource set identifier as described with reference to FIGS. 11 to 14.

At 1710, the base station 105 may perform a LBT procedure on a shared radio frequency spectrum band. The operations of 1710 may be performed according to the methods described herein. In some examples, aspects of the operations of 1710 may be performed by a LBT component as described with reference to FIGS. 11 to 14.

At 1715, the base station 105 may transmit, to a UE 115, the downlink control information on the shared radio frequency spectrum band based on the LBT procedure and using the control resource set specific to the TRP. The operations of 1715 may be performed according to the methods described herein. In some examples, aspects of the operations of 1715 may be performed by a control information transmitter as described with reference to FIGS. 11 to 14.

At 1720, the base station 105 may transmit data to the UE 115 based on the downlink control information. The operations of 1720 may be performed according to the methods described herein. In some examples, aspects of the operations of 1720 may be performed by a data transmitter as described with reference to FIGS. 11 to 14.

Figure 18:
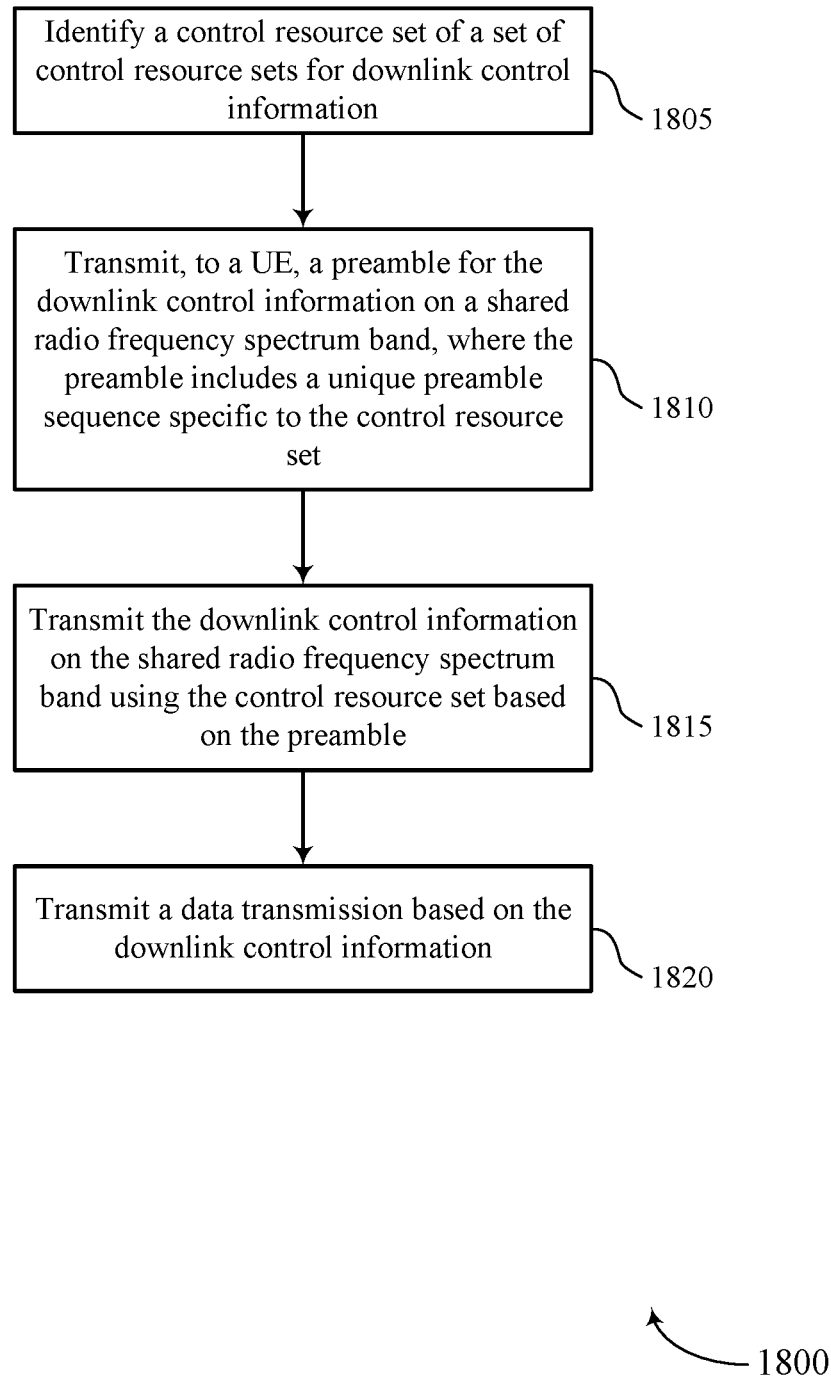

FIG. 18 shows a flowchart illustrating a method 1800 that supports enhanced downlink control information detection in accordance with aspects of the present disclosure. The operations of method 1800 may be implemented by a base station 105 or its components as described herein. For example, the operations of method 1800 may be performed by a communications manager as described with reference to FIGS. 11 to 14. In some examples, a base station may execute a set of instructions to control the functional elements of the base station to perform the functions described below. Additionally or alternatively, a base station may perform aspects of the functions described below using special-purpose hardware.

At 1805, the base station 105 may identify a control resource set of a set of control resource sets for downlink control information. The operations of 1805 may be performed according to the methods described herein. In some examples, aspects of the operations of 1805 may be performed by a control resource set identifier as described with reference to FIGS. 11 to 14.

At 1810, the base station 105 may transmit, to a UE 115, a preamble for the downlink control information on a shared radio frequency spectrum band, where the preamble includes a unique preamble sequence specific to the control resource set. The operations of 1810 may be performed according to the methods described herein. In some examples, aspects of the operations of 1810 may be performed by a preamble transmitter as described with reference to FIGS. 11 to 14.

At 1815, the base station 105 may transmit the downlink control information on the shared radio frequency spectrum band using the control resource set based on the preamble. The operations of 1815 may be performed according to the methods described herein. In some examples, aspects of the operations of 1815 may be performed by a control information transmitter as described with reference to FIGS. 11 to 14.

At 1820, the base station 105 may transmit data based on the downlink control information. The operations of 1820 may be performed according to the methods described herein. In some examples, aspects of the operations of 1820 may be performed by a data transmitter as described with reference to FIGS. 11 to 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
performing a preamble detection procedure on a shared radio frequency spectrum band for a plurality of transmission and reception points (TRPs), wherein each TRP of the plurality of TRPs is associated with a control resource set of a plurality of control resource sets for downlink control information and the preamble detection procedure is based at least in part on a unique preamble sequence for each control resource set of an associated TRP that passed a listen before talk procedure for the shared radio frequency spectrum band, wherein performing the preamble detection procedure comprises:
detecting, for at least one control resource set of the plurality of control resource sets, a first preamble within a bandwidth part of a data transmission and a second preamble outside of the bandwidth part of the data transmission, wherein the first preamble and the second preamble are detected at different resources in a frequency domain;
receiving the downlink control information using one or more control resource sets of the plurality of control resource sets; the one or more control resource sets selected based at least in part on the preamble detection procedure; and
receiving the data transmission associated with the downlink control information.

2. The method of claim 1, wherein receiving the downlink control information comprises:
determining that the preamble detection procedure is successful for the one or more control resource sets; and
selecting the one or more control resource sets based at least in part on the determining.

3. The method of claim 1, wherein
the first preamble is associated with a first TRP of the plurality of TRPs and the second preamble is associated with a second TRP of the plurality of TRPs.

4. The method of claim 1, further comprising:
receiving, via Radio Resource Control (RRC) signaling, a configuration to perform the preamble detection procedure outside of the bandwidth part of the data transmission.

5. The method of claim 4, wherein a duration of the first preamble is based at least in part on a frequency gap between the bandwidth part and a center frequency of the second preamble.

6. The method of claim 1, wherein a preamble to be detected by the preamble detection procedure comprises a reservation request (RRQ).

7. The method of claim 6, further comprising:
transmitting a reservation response (RRS) in response to at least one of the preamble and the data transmission.

8. The method of claim 7, wherein:
transmitting the RRS occurs at least once within a bandwidth part of the data transmission and at least once outside the bandwidth part of the data transmission.

9. The method of claim 1, wherein the bandwidth part in which the first preamble is detected is within in the shared radio frequency spectrum band and the second preamble is detected outside the shared radio frequency spectrum band.

10. A user equipment (UE), comprising:
one or more memories storing processor-executable code; and
one or more processors coupled with the one or more memories and individually or collectively operable to execute the code to cause the UE to:
perform a preamble detection procedure on a shared radio frequency spectrum band for a plurality of transmission and reception points (TRPs), wherein each TRP of the plurality of TRPs is associated with a control resource set of a plurality of control resource sets for downlink control information and the preamble detection procedure is based at least in part on a unique preamble sequence for each control resource set of an associated TRP that passed a listen before talk procedure for the shared radio frequency spectrum band, wherein, to perform the preamble detection procedure the one or more processors are individually or collectively operable to execute the code to cause the UE to:
detect, for at least one control resource set of the plurality of control resource sets, a first preamble within a bandwidth part of a data transmission and a second preamble outside of the bandwidth part of the data transmission, wherein the first preamble and the second preamble are detected at different resources in a frequency domain;
receive the downlink control information using one or more control resource sets of the plurality of control resource sets; the one or more control resource sets selected based at least in part on the preamble detection procedure; and
receive the data transmission based at least in part on the downlink control information.

11. The UE of claim 10, wherein, to receive the downlink control information, the one or more processors are individually or collectively operable to execute the code to cause the UE to:
determine that the preamble detection procedure is successful for the one or more control resource sets; and
select the one or more control resource sets based at least in part on the determining.

12. The UE of claim 10, wherein,
first preamble is associated with a first TRP of the plurality of TRPs and the is associated with a second TRP of the plurality of TRPs.

13. The UE of claim 10, wherein the one or more processors are individually or collectively further operable to execute the code to cause the UE to:
receive, via Radio Resource Control (RRC) signaling, a configuration to perform the preamble detection procedure outside of the bandwidth part of the data transmission.

14. The UE of claim 13, wherein a duration of the first preamble is based at least in part on a frequency gap between the bandwidth part and a center frequency of the second preamble.

15. The UE of claim 10, wherein a preamble to be detected by the preamble detection procedure comprises a reservation request (RRQ).

16. The UE of claim 15, wherein the one or more processors are individually or collectively further operable to execute the code to cause the UE to:
   transmit a reservation response (RRS) in response to at least one of the preamble and the data transmission.

17. The UE of claim 10, wherein the bandwidth part in which the first preamble is detected is within in the shared radio frequency spectrum band and the second preamble is detected outside the shared radio frequency spectrum band.

* * * * *